(12) United States Patent
Kim et al.

(10) Patent No.: US 12,462,946 B2
(45) Date of Patent: Nov. 4, 2025

(54) METHODS AND APPARATUS FOR ARRANGING ATOMS IN ARRAYS

(71) Applicant: QuEra Computing Incorporated, Boston, MA (US)

(72) Inventors: Donggyu Kim, Boston, MA (US); Dirk Englund, New York, NY (US); Nathan Gemelke, Boston, MA (US); Alexei Bylinskii, Boston, MA (US); Markus Greiner, Boston, MA (US)

(73) Assignee: QuEra Computing Incorporated, Boston, MA (US)

( * ) Notice: Subject to any disclaimer, the term of this patent is extended or adjusted under 35 U.S.C. 154(b) by 425 days.

(21) Appl. No.: 17/924,458

(22) PCT Filed: May 11, 2021

(86) PCT No.: PCT/US2021/031709
§ 371 (c)(1),
(2) Date: Nov. 10, 2022

(87) PCT Pub. No.: WO2021/231378
PCT Pub. Date: Nov. 18, 2021

(65) Prior Publication Data
US 2023/0282385 A1   Sep. 7, 2023

Related U.S. Application Data

(60) Provisional application No. 63/023,461, filed on May 12, 2020.

(51) Int. Cl.
*G21K 1/00* (2006.01)

(52) U.S. Cl.
CPC .................................. *G21K 1/006* (2013.01)

(58) Field of Classification Search
CPC ...................................................... G21K 1/006
See application file for complete search history.

(56) References Cited

U.S. PATENT DOCUMENTS

| | | | | |
|---|---|---|---|---|
| 2004/0017833 | A1* | 1/2004 | Cundiff | H01S 3/1112 372/18 |
| 2016/0064108 | A1* | 3/2016 | Saffman | G21K 1/006 250/251 |
| 2020/0185120 | A1* | 6/2020 | Keesling Contreras | G21K 1/093 |

FOREIGN PATENT DOCUMENTS

WO   WO 2019/014589 A1   1/2019

OTHER PUBLICATIONS

Invitation to Pay Additional Fees mailed Aug. 5, 2021 in connection with International Application No. PCT/US2021/031709.
(Continued)

*Primary Examiner* — Sean M Luck
(74) *Attorney, Agent, or Firm* — Morgan, Lewis & Bockius LLP

(57) ABSTRACT

The present application discloses methods and apparatus for arranging atoms in arrays. A system for arranging atoms within a 3-dimensional space includes an optical system (920) operable to produce a plurality of switchable optical traps (925) within the 3-dimensional space, a sensor (930) configured to detect atoms within the plurality of switchable optical traps, a scanner (990) operable to simultaneously move multiple atoms within the plurality of switchable optical traps, and at least one controller (905) configured to operate the optical system and the scanner to sort atoms within the plurality of switchable optical traps into a desired configuration of atoms, said operation of the optical system and the scanner being based at least in part on sensor data generated by the sensor detecting atoms within the plurality of switchable optical traps.

43 Claims, 25 Drawing Sheets

(56) References Cited

OTHER PUBLICATIONS

International Search Report and Written Opinion mailed Nov. 25, 2021 in connection with International Application No. PCT/US2021/031709.
International Preliminary Report on Patentability mailed Nov. 24, 2022 in connection with International Application No. PCT/US2021/031709.
De Mello Do, et al., Defect-free assembly of 2D clusters of more than 100 single-atom quantum systems. Quantum Physics. Feb. 5, 2019; arXiv:1902.00284v2. 10 pages.
Endres et al., Cold matter assembled atom-by-atom. Quantum Physics. Jul. 11, 2016. arXiv:1607.03044. 12 pages.
Lee et al., Defect-free atomic array formation using the Hungarian matching algorithm. Arxiv.org, arXiv: 1704.07074v1. Apr. 24, 2017. DOI: 10.1103/PHYSREVA.95.053424. 7 pages.
Miroshnychenko et al., Precision preparation of strings of trapped neutral atoms. New Journal of Physics. Jul. 31, 2006;8(9): 191; 45 pages.
Schlosser et al., Fast transport, atom sample splitting and single-atom qubit supply in two-dimensional arrays of optical microtraps. New Journal of Physics. Dec. 31, 2012;14(12):123034; 18 pages.
Vala et al., Perfect initialization of a quantum computer of neutral atoms in an optical lattice of large lattice constant. Quantum Physics, arXiv:quant-ph/0307085. Jul. 10, 2003;18 pages.
Zhou et al., Controllable optical multi-well trap and its optical lattices using compounded cosine patterns. Chinese Physics B, Atomic and Molecular Physics. Dec. 9, 2010;19(12):123203; 12 pages.
Zimmermann et al., High-resolution imaging of ultracold fermions in microscopically tailored optical potentials. Quantum Gas. Apr. 8, 2011; arXiv:1011.1004v2. 15 pages.

\* cited by examiner

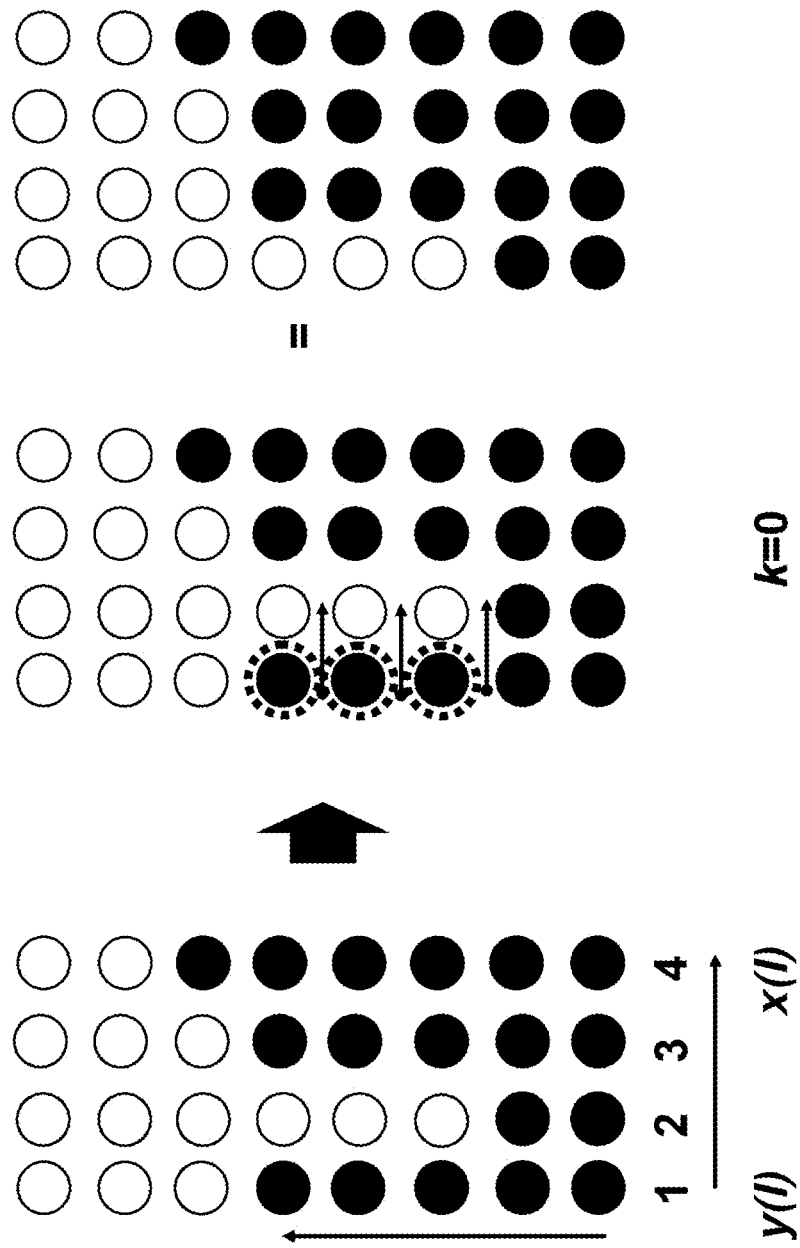

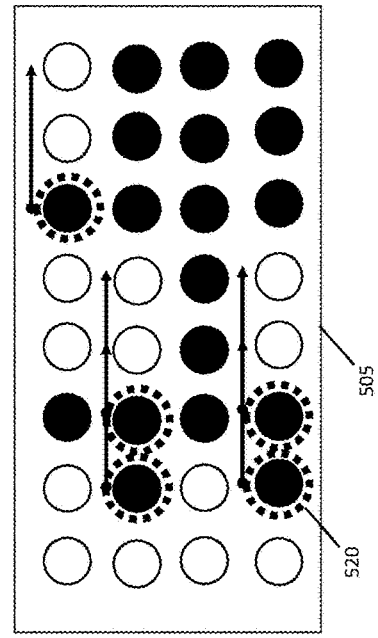
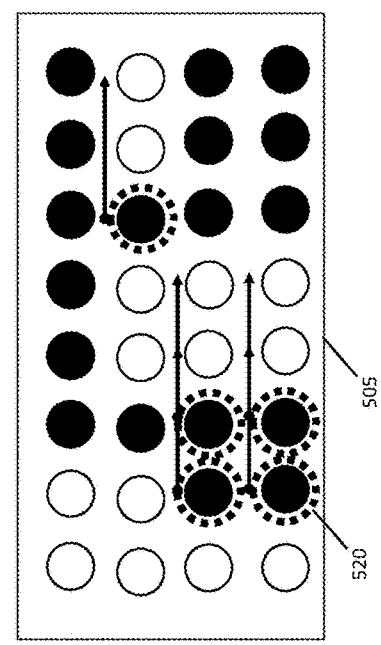
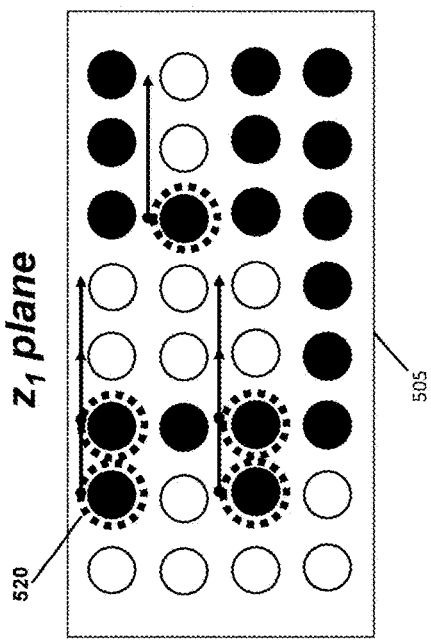
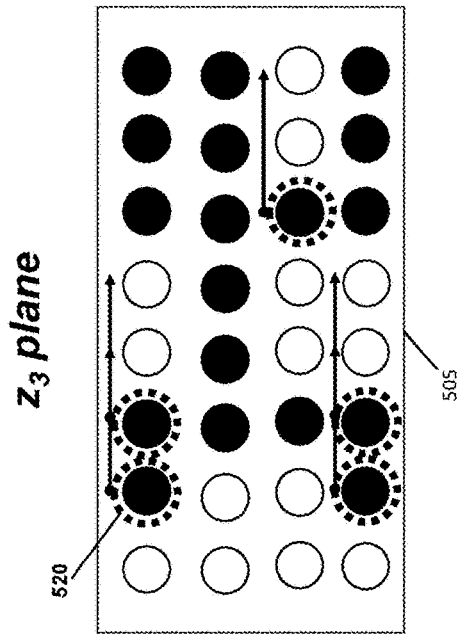
FIG. 5D $k=2$
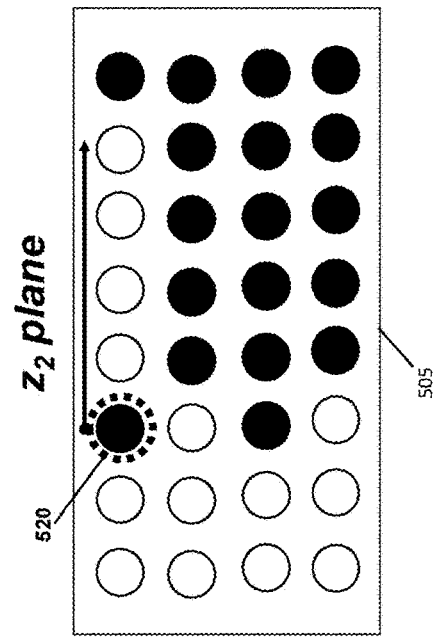
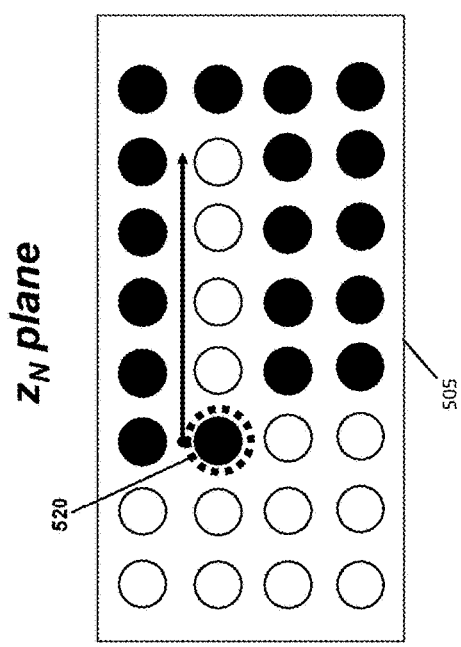
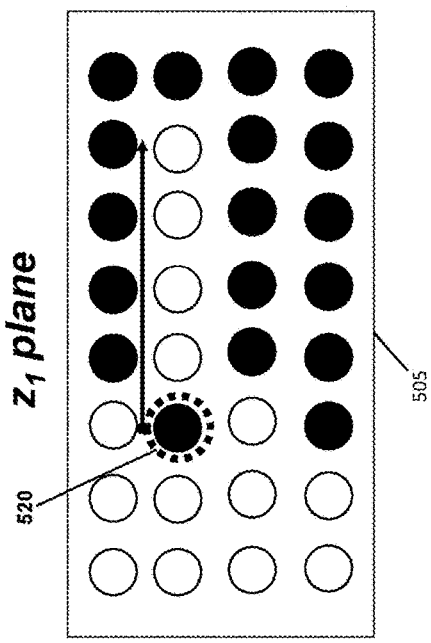
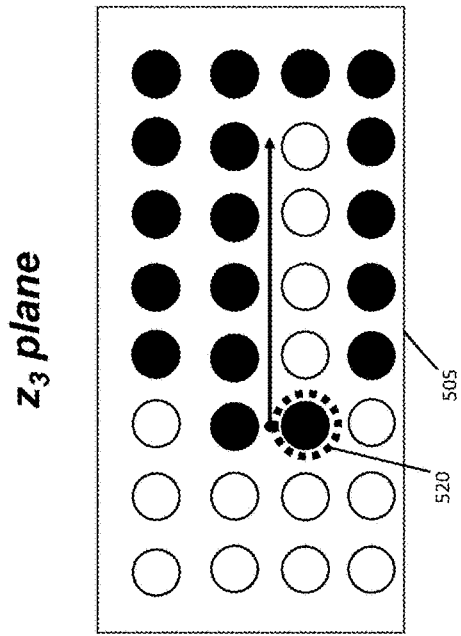
FIG. 5E

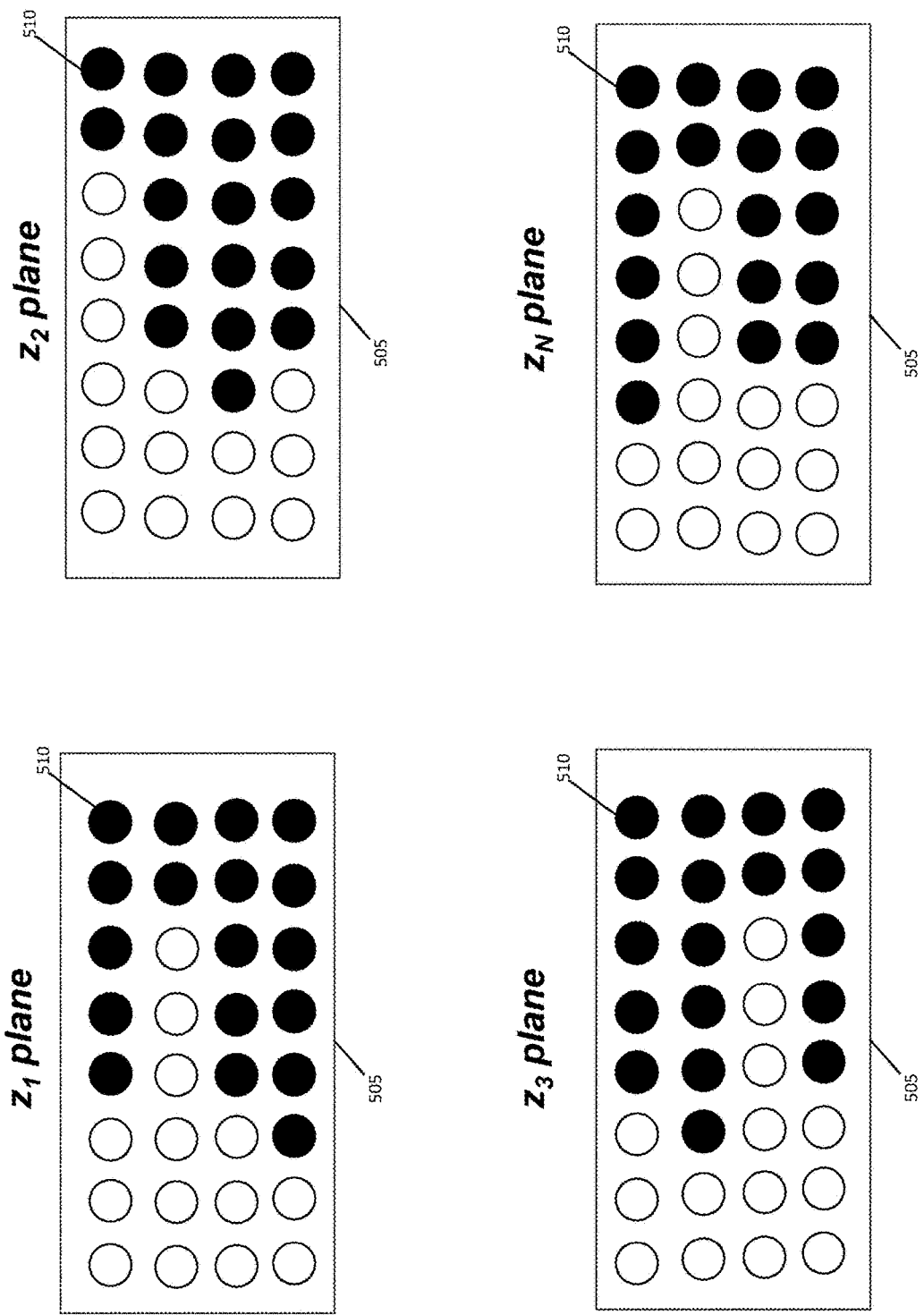

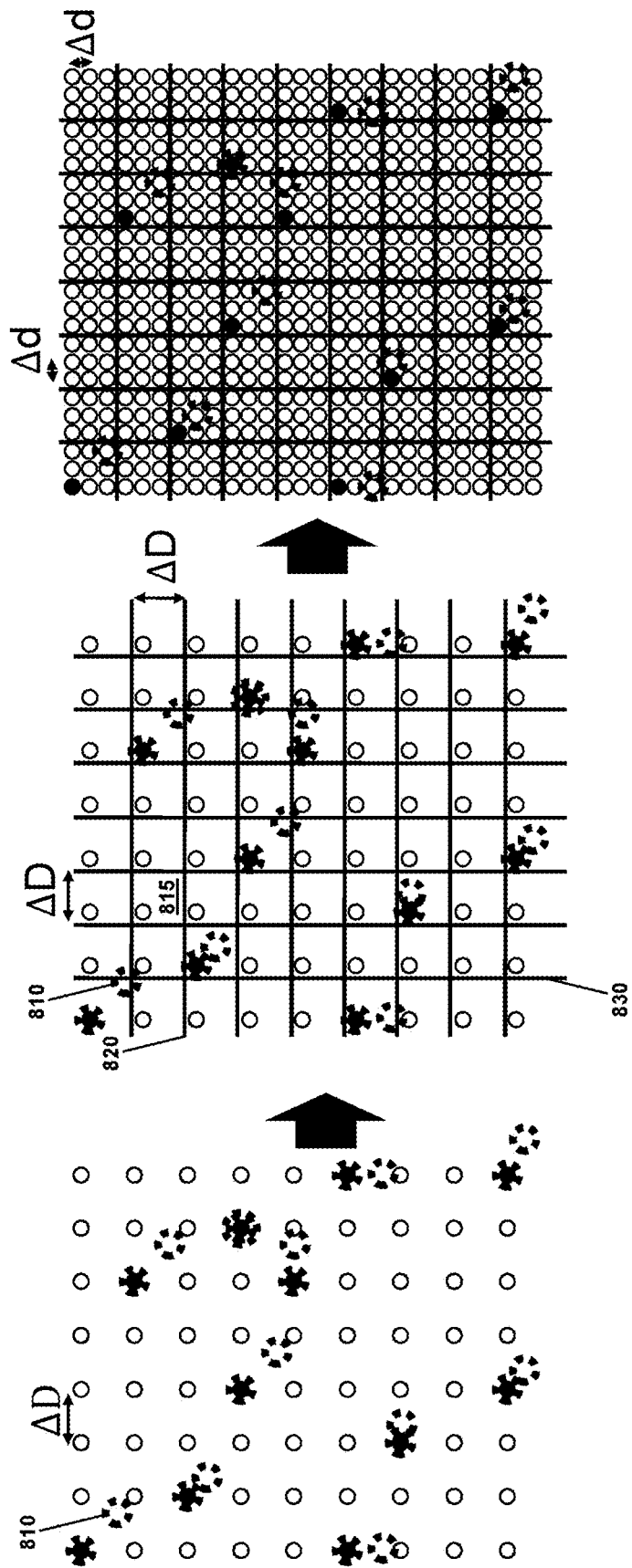

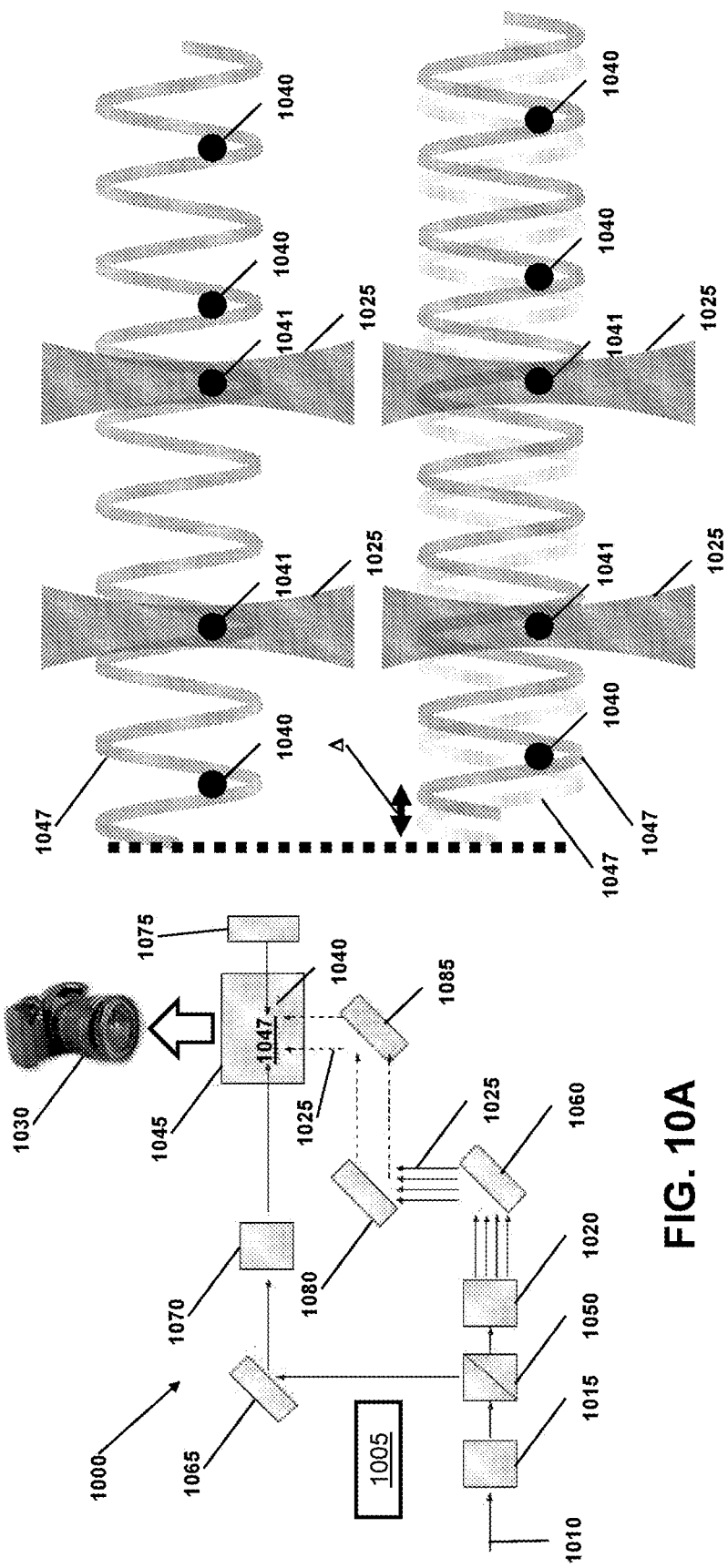

METHODS AND APPARATUS FOR ARRANGING ATOMS IN ARRAYS

CROSS-REFERENCE TO RELATED APPLICATIONS

The present application is a national stage filing under 35 U.S.C. § 371 of International Patent Application Serial No. PCT/US2021/031709, filed May 11, 2021, entitled "Methods and Apparatus for Arranging Atoms in Arrays", which claims the benefit under 35 U.S.C. § 119(e) of U.S. Provisional Application No. 63/023,461, filed May 12, 2020, titled "Methods and Apparatus for Arranging Atoms in Arrays," the entire content of each of which is hereby incorporated by reference in its entirety.

BACKGROUND

Cold atoms provide excellent platforms for quantum technologies such as quantum metrology and quantum information processing. Recent developments in deterministically arranging atoms enable creating defect-free atom geometries (e.g., regularly spaced atom arrays) that are essential resources for quantum computation and quantum simulation. A typical approach to creating such arrays is to load atoms into reconfigurable optical tweezers from a magneto-optical trap (MOT) and then rearrange the loaded tweezers into a target atom geometry. See M. Endres, H. Bernien, A. Keesling, H. Levine, E. R. Anschuetz, A. Krajenbrink, C. Senko, V. Vuletic, M. Greiner, and M. D. Lukin, *Atom-by-atom assembly of defect-free one-dimensional cold atom arrays*, Science vol. 354 (6315) p. 1024-1027 (2016), which is hereby incorporated by reference in its entirety.

Various types of spatial light modulators (SLMs) are used to generate such reconfigurable optical tweezers. One example uses acousto-optic deflectors (AODs) to create such tweezer arrays. AODs deflect an incident laser beam into multiple beams, the deflection angle of each beam being controlled by the acoustic wave frequencies applied to the deflector. Continuously varying the frequencies changes the deflection angles of the laser beams, reconfiguring the tweezer beams in one dimension. It has also been shown that two crossed AODs enable arranging atoms in two dimensions (2D). Specifically, N beams are created by passing a laser beam through the first AOD. At the second AOD (oriented at 90° with respect to the first AOD), each of the N beams is split up into another M beams, thus creating a total of M×N beams.

These approaches, however, present difficulties in creating a large-scale 2D atom array due to complexity in the creation and movement of the tweezer beams and the extended run time required for arranging the tweezers. For example, the two-crossed-AODs approach creates M×N tweezer beams but has only M+N degrees of freedom, requiring an extended run time to sequentially arrange the tweezer beams. Given that optical tweezers can hold atoms for a finite time that is limited by background atomic gas collisions, such an extended run time limits the scale of defect-free atom arrays.

Therefore, there is a need for continuing improvement in arranging atoms in arrays.

SUMMARY

Various embodiments disclosed herein relate to methods and apparatus for arranging atoms in arrays. In accordance with one or more embodiments, a system for arranging atoms within a 3-dimensional space includes an optical system operable to produce a plurality of switchable optical traps within the 3-dimensional space, a sensor configured to detect atoms within the plurality of switchable optical traps, a scanner operable to simultaneously move multiple atoms within the plurality of switchable optical traps, and at least one controller configured to operate the optical system and the scanner to sort atoms within the plurality of switchable optical traps into a desired configuration of atoms, said operation of the optical system and the scanner being based at least in part on sensor data generated by the sensor detecting atoms within the plurality of switchable optical traps. In some embodiments, the optical system can comprise at least one spatial light modulator (SLM) that, when operated, deactivates one or more switchable optical traps of the plurality of switchable optical traps. In some of these embodiments, the at least one controller can be further configured to operate the at least one SLM to activate or deactivate the one or more switchable optical traps. In certain embodiments, the optical system can further include a second spatial light modulator (SLM) operable to produce a plurality of static optical traps within the 3-dimensional space that have shallower trap potentials than the array of switchable optical traps produced by the optical system. In some of these embodiments, the array of static optical traps can form a regularly spaced array in a 2-dimensional plane within the 3-dimensional space. In certain embodiments, the sensor can comprise an optical camera. In some embodiments, the desired configuration of atoms can be a close-packed configuration. In certain embodiments, the scanner can include a mirror galvanometer and a focus tunable lens. In some embodiments, the at least one controller can be configured to receive the sensor data generated by the sensor, and operate the optical system and the scanner to perform a plurality of operations without receiving further sensor data from the sensor, wherein in each of the plurality of operations a plurality of atoms is moved within the 3-dimensional space. In certain embodiments, the plurality of switchable optical traps can be arranged in a regularly spaced n-position array. In some of these embodiments, the at least one controller can be configured to determine, based on the sensor data generated by the sensor, a number of positions to move each of a plurality of atoms captured within the array of switchable optical traps to sort the atoms into the desired configuration within the regularly spaced n-position array, and generate, based on the determined number of positions for each of the plurality of atoms, a sequence of operations in which the plurality of atoms is moved using the scanner from initial positions in the 3-dimensional space to close-packed positions in the 3-dimensional space. In certain of these embodiments, during at least one operation of the sequence of operations, at least two of the plurality of atoms are simultaneously moved using the scanner. In some of these embodiments, the number of positions for each of the plurality of atoms can be expressed as a binary number, and the at least one controller can be configured to generate the sequence of operations by, for each atom of the plurality of atoms, interpreting each bit of the binary number from least significant bit to most significant bit as instructions to move, or not move, the atom based on whether the bit is a one or a zero, respectively. In certain of these embodiments, the at least one controller can be configured to determine the number of positions d(l) to move each atom l of the plurality of atoms using the scanner to sort the atoms into the desired configuration, express the determined number of positions for each of the plurality of atoms d(l) as an m-bit binary number, where m=round($\log_2$(n−1)), operate the scanner to move each atom l by a number of positions $d_{l,k}=a_{l,k}2^k$, wherein $a_{l,k}\in\{0,1\}$ is the bit k in the binary number for each atom l, and repeat m times the moving of each atom l, incrementing k=k+1 each time from k=0.

In certain other embodiments wherein the plurality of switchable optical traps is arranged in a regularly spaced n-position array, the at least one controller can be configured to determine, based on the sensor data generated by the sensor, a number of positions to move each of a plurality of atoms captured within the array of switchable optical traps to sort the atoms into the desired configuration within the regularly spaced n-position array, and generate, based on the determined number of positions for each of the plurality of atoms, a sequence of operations in which the plurality of atoms is moved using the scanner from close-packed positions in the 3-dimensional space to target positions in the 3-dimensional space. In some of these embodiments, during at least one operation of the sequence of operations, at least two of the plurality of atoms are simultaneously moved using the scanner. In certain of these embodiments, the number of positions for each of the plurality of atoms can be expressed as a binary number, and the at least one controller can be configured to generate the sequence of operations by, for each atom of the plurality of atoms, interpreting each bit of the binary number from most significant bit to least significant bit as instructions to move, or not move, the atom based on whether the bit is a one or a zero, respectively. In some of these embodiments, the at least one controller can be configured to determine the number of positions f(l) to move each atom l of the plurality of atoms using the scanner to sort the atoms into the desired configuration within the regularly spaced n-position array, express the determined number of positions for each of the plurality of atoms f(l) as an m-bit binary number, where m=round($\log_2$(n−1)), operate the scanner to move each atom l by a number of positions $f_{l,k}=a_{l,k}2^k$, wherein $a_{l,k}\in\{0,1\}$ is the bit k in the binary number for each atom l, and repeat the moving of each atom l, decrementing k=k−1 each time until k=0.

In some other embodiments wherein the plurality of switchable optical traps is arranged in a regularly spaced n-position array, the at least one controller can be configured to determine, based on the sensor data generated by the sensor, a number of positions to move each of a plurality of atoms captured within the array of switchable optical traps to sort the atoms into the desired configuration within the regularly spaced n-position array, and generate, based on the determined number of positions for each of the plurality of atoms, a sequence of operations in which the plurality of atoms is moved using the scanner from initial positions in the 3-dimensional space to target positions in a regularly spaced h-position array of switchable high-resolution optical traps having a higher resolution than the n-position array within the 3-dimensional space. In certain of these embodiments, during at least one operation of the sequence of operations, at least two of the plurality of atoms can be simultaneously moved using the scanner. In some of these embodiments, the number of positions for each of the plurality of atoms can be expressed as a binary number, and the at least one controller can be configured to generate the sequence of operations by, for each atom of the plurality of atoms, interpreting each bit of the binary number from least significant bit to most significant bit as instructions to move, or not move, the atom based on whether the bit is a one or a zero, respectively. In certain of these embodiments, the at least one controller can be configured to determine the number of positions g(l) to move each atom l of the plurality of atoms using the scanner to sort the atoms into the desired configuration within the regularly spaced h-position array, express the determined number of positions for each of the plurality of atoms g(l) as a u-bit binary number, where u=round($\log_2$(h−1)), operate the scanner to move each atom l by a number of positions $g_{l,k}=a_{l,k}2^k$, wherein $a_{l,k}\in\{0,1\}$ is the bit k in the binary number for each atom l, and repeat u times the moving of each atom l, incrementing k=k+1 each time from k=0.

In accordance with one or more embodiments, a method for arranging atoms within a 3-dimensional space includes operating an optical system to produce a plurality of switchable optical traps within the 3-dimensional space, detecting atoms captured within the plurality of switchable optical traps using a sensor, operating a scanner to simultaneously move multiple atoms within the plurality of switchable optical traps, and operating, using at least one controller, the optical system and the scanner to sort atoms within the plurality of switchable optical traps into a desired configuration of atoms, said operation of the optical system and the scanner being based at least in part on sensor data generated by the sensor detecting atoms within the plurality of switchable optical traps. In some embodiments, the method can further include operating at least one spatial light modulator (SLM) to deactivate one or more switchable optical traps of the plurality of switchable optical traps. In certain embodiments, the method can further include operating a second spatial light modulator (SLM) to produce a regularly spaced n-position array of static optical traps within the 3-dimensional space that have shallower trap potentials than the plurality of switchable optical traps produced by the optical system. In some of these embodiments, the array of static optical traps can form a regularly spaced array in a 2-dimensional plane within the 3-dimensional space. In certain embodiments, the sensor can comprise an optical camera. In some embodiments, the desired configuration can be a close-packed configuration. In certain embodiments, the scanner can include a mirror galvanometer and a focus tunable lens. In some embodiments, the method can further include receiving, by the at least one controller, the sensor data generated by the sensor, and operating, by the at least one controller, the optical system and the scanner to perform a plurality of operations without receiving further sensor data from the sensor, wherein in each of the plurality of operations a plurality of atoms is moved within the 3-dimensional space. In certain embodiments, the plurality of switchable optical traps can be arranged in a regularly spaced n-position array. In some of these embodiments, the method can further include determining, by the at least one controller based on the sensor data generated by the sensor, a number of positions to move each of a plurality of atoms captured within the array of switchable optical traps to sort the atoms into the desired configuration within the regularly spaced n-position array, and generating, by the at least one controller based on the determined number of positions for each of the plurality of atoms, a sequence of operations in which the plurality of atoms is moved using the scanner from initial positions in the 3-dimensional space to close-packed positions in the 3-dimensional space. In certain of these embodiments, during at least one operation of the sequence of operations, at least two of the plurality of atoms can be simultaneously moved using the scanner. In some of these embodiments, the number of positions for each of the plurality of atoms can be expressed as a binary number, and the method can further comprise generating, by the at least one controller, the sequence of operations by, for each atom of the plurality of atoms, interpreting each bit of the binary number from least significant bit to most significant bit as instructions to move, or not move, the atom based on whether the bit is a one or a zero, respectively. In certain of these embodiments, the method can further include, by the at least one controller, determining the number of positions d(l) to move each atom l of the plurality of atoms using the scanner to sort the atoms into the desired configuration, expressing the determined number of positions for each of the plurality of atoms d(l) as an m-bit binary number, where m=round(log$_2$(n−1)), operating the scanner to move each atom l by a number of positions $d_{l,k}=a_{l,k} 2^k$, wherein $a_{l,k} \in \{0, 1\}$ is the bit k in the binary number for each atom l, and repeating m times the moving of each atom l, incrementing k=k+1 each time from k=0.

In certain other embodiments wherein the plurality of switchable optical traps is arranged in a regularly spaced n-position array, the method can further include, by the at least one controller, determining, based on the sensor data generated by the sensor, a number of positions to move each of a plurality of atoms captured within the array of switchable optical traps to sort the atoms into the desired configuration within the regularly spaced n-position array, and generating, based on the determined number of positions for each of the plurality of atoms, a sequence of operations in which the plurality of atoms is moved using the scanner from close-packed positions in the 3-dimensional space to target positions in the 3-dimensional space. In some of these embodiments, during at least one operation of the sequence of operations, at least two of the plurality of atoms can be simultaneously moved using the scanner. In certain of these embodiments, the number of positions for each of the plurality of atoms can be expressed as a binary number, and the at least one controller can be configured to generate the sequence of operations by, for each atom of the plurality of atoms, interpreting each bit of the binary number from most significant bit to least significant bit as instructions to move, or not move, the atom based on whether the bit is a one or a zero, respectively. In some of these embodiments, the method can further include, by the at least one controller, determining the number of positions f(l) to move each atom l of the plurality of atoms using the scanner to sort the atoms into the desired configuration within the regularly spaced n-position array, expressing the determined number of positions for each of the plurality of atoms f(l) as an m-bit binary number, where m=round(log$_2$(n−1)), operating the scanner to move each atom l by a number of positions $f_{l,k}=a_{l,k} 2^k$, wherein $a_{l,k} \in \{0,1\}$ is the bit k in the binary number for each atom l, and repeating the moving of each atom l, decrementing k=k−1 each time until k=0.

In some other embodiments wherein the plurality of switchable optical traps is arranged in a regularly spaced n-position array, the method can further include, by the at least one controller, determining, based on the sensor data generated by the sensor, a number of positions to move each of a plurality of atoms captured within the array of switchable optical traps to sort the atoms into the desired configuration within the regularly spaced n-position array, and generating, based on the determined number of positions for each of the plurality of atoms, a sequence of operations in which the plurality of atoms is moved using the scanner from initial positions in the 3-dimensional space to target positions in a regularly spaced h-position array of switchable high-resolution optical traps having a higher resolution than the n-position array within the 3-dimensional space. In certain of these embodiments, during at least one operation of the sequence of operations, at least two of the plurality of atoms can be simultaneously moved using the scanner. In some of these embodiments, the number of positions for each of the plurality of atoms can be expressed as a binary number, and the at least one controller can be configured to generate the sequence of operations by, for each atom of the plurality of atoms, interpreting each bit of the binary number from least significant bit to most significant bit as instructions to move, or not move, the atom based on whether the bit is a one or a zero, respectively. In certain of these embodiments, the method can further include, by the at least one controller, determining the number of positions g(l) to move each atom l of the plurality of atoms using the scanner to sort the atoms into the desired configuration within the regularly spaced h-position array, expressing the determined number of positions for each of the plurality of atoms g(l) as a u-bit binary number, where u=round(log$_2$(h−1)), operating the scanner to move each atom l by a number of positions $g_{l,k}=a_{l,k} 2^k$, wherein $a_{l,k} \in \{0,1\}$ is the bit k in the binary number for each atom l, and repeating u times the moving of each atom l, incrementing k=k+1 each time from k=0.

In accordance with one or more embodiments, at least one non-transitory computer readable medium comprises instructions that, when executed, perform a method for arranging atoms within a plurality of optical traps arranged within a 3-dimensional space, the method comprising operating an optical system to produce a plurality of switchable optical traps within the 3-dimensional space, detecting atoms captured within the plurality of switchable optical traps using a sensor, operating a scanner to simultaneously move multiple atoms within the array of switchable optical traps, and operating, using at least one controller, the optical system and the scanner to sort atoms within the plurality of switchable optical traps into a desired configuration of atoms, said operation of the optical system and the scanner being based at least in part on sensor data generated by the sensor detecting atoms within the plurality of switchable optical traps. Further embodiments of the method can be executed as described above.

In accordance with one or more embodiments, a system for arranging atoms within a 3-dimensional space includes a first optical system operable to produce an optical lattice that forms a regularly spaced n-position array of optical traps within the 3-dimensional space, a second optical system operable to produce an array of switchable optical traps within the regularly spaced n-position array, a sensor configured to detect atoms captured within the regularly spaced n-position array of optical traps, a phase modulator operable to adjust a phase of the optical lattice to simultaneously move multiple atoms captured within the regularly spaced n-position array of optical traps, and at least one controller configured to operate the optical system and the phase modulator to sort atoms within the regularly spaced n-position array into a desired configuration of atoms, said operation of the optical system and the phase modulator being based at least in part on sensor data generated by the sensor detecting atoms captured within the regularly spaced n-position array of optical traps.

In accordance with one or more embodiments, a method for arranging atoms within a plurality of optical traps arranged within a 3-dimensional space includes generating, using at least one processor, a sequence of operations in which a plurality of atoms are moved amongst the plurality of optical traps from initial positions in the 3-dimensional space to target positions in the 3-dimensional space, wherein during at least one operation of the sequence of operations, at least two of the plurality of atoms are simultaneously moved amongst traps of the plurality of optical traps, and operating a scanner to move one or more of the plurality of atoms amongst traps of the plurality of optical traps in accordance with the generated sequence of operations. In some embodiments, the method can further include generating, using a sensor, sensor data representing positions of the plurality of atoms within the plurality of optical traps, and operating the scanner to perform the sequence of operations without generating further sensor data representing positions of the plurality of atoms within the plurality of optical traps. In certain of these embodiments, the sensor data can indicate which of the plurality of optical traps contain one of the plurality of atoms. In some embodiments, the plurality of optical traps can produce a regularly spaced array in the 3-dimensional space. In certain embodiments, the plurality of optical traps can produce the regularly spaced array in a 2-dimensional plane within the 3-dimensional space. In some embodiments, the method can further include generating the plurality of optical traps by operating at least one spatial light modulator (SLM). In certain embodiments, the scanner can be configured to produce a plurality of movable traps within the 3-dimensional space that have lower potentials than the plurality of optical traps. In some embodiments, the method can further include determining, by the at least one processor based on the sensor data generated by the sensor, a number of positions to move each of a plurality of atoms amongst traps of the plurality of optical traps to sort the atoms into a desired configuration. In certain of these embodiments, the method can further include expressing, using the at least one processor, the determined number of positions for each of the plurality of atoms as a binary number, and generating, using the at least one processor, the sequence of operations by, for each atom of the plurality of atoms, interpreting each bit of the binary number from least significant bit to most significant bit as instructions to move, or not move, the atom based on whether the bit is a one or a zero, respectively. In some of these embodiments, the plurality of optical traps can produce a regularly spaced n-position array in the 3-dimensional space, and the method further includes, using the at least one processor determining the number of positions d(l) to move each atom l of the plurality of atoms amongst traps of the plurality of optical traps to sort the atoms into the desired configuration, expressing the determined number of positions for each of the plurality of atoms d(l) as an m-bit binary number, where m=round($\log_2$(n−1)), operating the scanner to move each atom l by a number of positions $d_{l,k}=a_{l,k} 2^k$, wherein $a_{l,k} \in \{0,1\}$ is the bit k in the binary number for each atom l, and repeating m times the moving of each atom l, incrementing k=k+1 each time from k=0. In certain of these embodiments, the desired configuration can be a close packed configuration.

In accordance with one or more embodiments, at least one non-transitory computer readable medium comprises instructions that, when executed, perform a method for arranging atoms within a plurality of optical traps arranged within a 3-dimensional space, the method comprising generating, using at least one processor, a sequence of operations in which a plurality of atoms are moved amongst the plurality of optical traps from initial positions in the 3-dimensional space to target positions in the 3-dimensional space, wherein during at least one operation of the sequence of operations, at least two of the plurality of atoms are simultaneously moved amongst traps of the plurality of optical traps, and operating a scanner to move one or more of the plurality of atoms amongst traps of the plurality of optical traps in accordance with the generated sequence of operations. Further embodiments of the method can be executed as described above.

Arranging atoms within an array using the systems and methods described herein has many advantages, as it enables positioning large numbers of atoms (e.g., millions of atoms) in a 3D plane in a time that scales logarithmically with the number of atoms.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4 schematically illustrates arranging multiple rows of atoms in close-packed arrays in accordance with one or more embodiments;

FIGS. 5A-5F schematically illustrate arranging multiple rows of atoms within a 3-dimensional space in close-packed arrays in accordance with one or more embodiments;

FIGS. 8A-8E schematically illustrate unpacking atoms from a target pattern into a higher resolution target pattern in accordance with one or more embodiments;

FIG. 10A schematically illustrates a system for arranging atoms in arrays including an optical lattice in accordance with one or more embodiments;

FIG. 10B schematically illustrates an optical lattice for arranging atoms in arrays in accordance with one or more embodiments;

DETAILED DESCRIPTION

As stated above, various embodiments disclosed herein relate to methods and apparatus for arranging atoms in arrays. The systems and methods described herein enable the generation of very large arrays (e.g., 100 or more) of cold atoms. Neutral atoms can serve as building blocks for large—scale quantum systems. They can be well isolated from the environment, enabling long-lived quantum memories. Initialization, control, and read-out of their internal and motional states is accomplished by resonance methods developed over the past four decades. Arrays comprising a large number of identical atoms can be rapidly assembled while maintaining single-atom optical control. These bottom-up approaches are complementary to the methods involving optical lattices loaded with ultracold atoms prepared via evaporative cooling, and generally result in atom separations of several micrometers. Controllable interactions between the atoms can be introduced to utilize these arrays for quantum simulation and quantum information processing. This can be achieved by coherent coupling to highly excited Rydberg states, which exhibit strong, long-range interactions. This approach provides a powerful platform for many applications, including fast multi-qubit quantum gates, quantum simulations of Ising-type spin models, and the study of collective behavior in mesoscopic ensembles.

Figure 1:
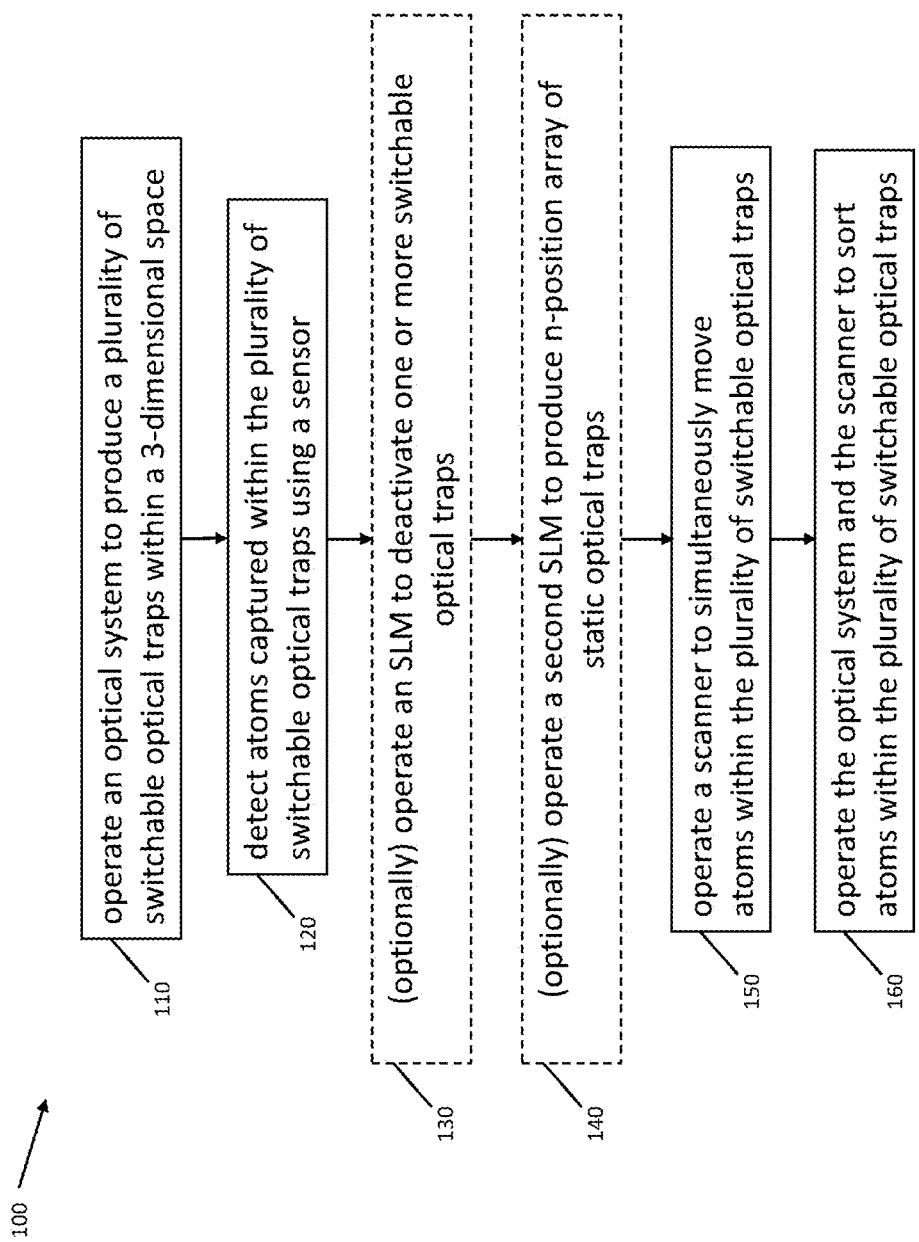
FIG. 1 illustrates a flowchart of a method of arranging atoms in arrays in accordance with one or more embodiments.

In accordance with one or more embodiments, a method 100, illustrated in the flowchart shown in FIG. 1, for arranging atoms within a 3-dimensional space includes operating (110) an optical system to produce a plurality of switchable optical traps within the 3-dimensional space, detecting (120) atoms captured within the plurality of switchable optical traps using a sensor, operating (150) a scanner to simultaneously move multiple atoms within the plurality of switchable optical traps, and operating (160), using at least one controller, the optical system and the scanner to sort atoms within the plurality of switchable optical traps into a desired configuration of atoms, said operation 160 of the optical system and the scanner being based at least in part on sensor data generated by the sensor detecting atoms within the plurality of switchable optical traps. The sensor can be, for example, an optical camera, as described further below. The switchable optical traps are optical traps that can be switched on and off using the controller. In certain embodiments, the scanner can include a mirror galvanometer and a focus tunable lens, as described further below. The method can include receiving, by the at least one controller, the sensor data generated by the sensor, and operating, by the at least one controller, the optical system and the scanner to perform a plurality of operations without receiving further sensor data from the sensor, wherein in each of the plurality of operations a plurality of atoms is moved within the 3-dimensional space. In some embodiments, the method can further include operating (130) at least one spatial light modulator (SLM) to deactivate one or more switchable optical traps of the plurality of switchable optical traps. The deactivated switchable optical traps are either optical traps that do not contain trapped atoms, or, if the operation (150) is accomplished within a time in a range of between 10 μsec and 100 μsec, optical traps that contain atoms that remain stationary during that particular operation of the scanner, following which operation the stationary atoms are again trapped by reactivating the respective switchable optical traps. Alternatively, the method can further include operating (140) a second spatial light modulator (SLM) to produce a regularly spaced n-position array of static optical traps within the 3-dimensional space that have shallower trap potentials than the array of switchable optical traps produced by the optical system, as described further below. The optional static optical traps trap stationary atoms during a given operation of the scanner, and thereby relax the timing requirement on the operation of the scanner.

Figure 2:
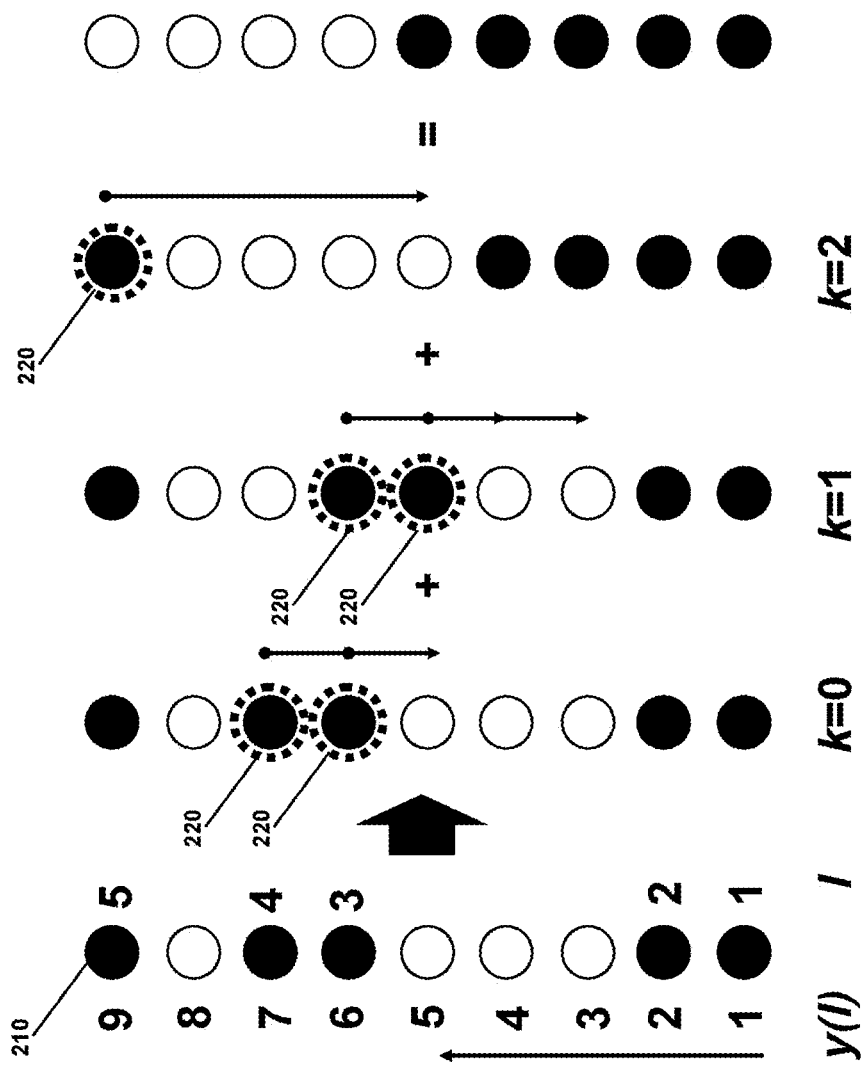
FIG. 2 schematically illustrates arranging atoms in a close-packed array in accordance with one or more embodiments.

The plurality of switchable optical traps can be arranged in a regularly spaced n-position array, such as the 9 position array (i.e., n=9) shown in FIG. 2. The method can further include determining, by the at least one controller based on the sensor data generated by the sensor, a number of positions to move each of a plurality of atoms captured within the array of switchable optical traps to sort the atoms into the desired configuration within the regularly spaced n-position array, and generating, by the at least one controller based on the determined number of positions for each of the plurality of atoms, a sequence of operations in which the plurality of atoms is moved using the scanner from initial positions in the 3-dimensional space to close-packed positions in the 3-dimensional space. Moving atoms within the n-position array, such as the 5 atoms within the 9 position array (n=9) in the example illustrated in FIG. 2, includes imaging positions y(l) of atoms l=1, 2, 3, 4, 5, counting from the bottom, within the n-position array, computing a number of positions $d_l = y(l) - l$ that each atom l is to be moved within the n-position array for a close-packed array, $d_l$ listed in Table 1, computing a number of bits m, where m=round $(\log_2(n-1))$, round(x) rounding the result x to the next lowest integer, which yields m=3 in this example $(9-1=8=2^3)$, expressing $d_l$ as an m-bit binary number, moving each atom l by a number of positions $d_{l,k} = a_{l,k} 2^k$, wherein $a_{l,k} \in \{0,1\}$ is the bit k in the binary expression of $d_l$ for each atom l, and repeating m times the moving of each atom l, incrementing k=k+1 each time from k=0. In this way, the number of positions for each of the plurality of atoms is expressed as a binary number, and the method includes generating, by the at least one controller, the sequence of operations by, for each atom of the plurality of atoms, interpreting each bit of the binary number from least significant bit to most significant bit as instructions to move, or not move, the atom based on whether the bit is a one or a zero, respectively. As shown in FIG. 2, at k=0, atoms l=3 and l=4 each move by 1 position $(a_{3,0} = a_{4,0} = 1, 2^0 = 1)$, at k=1, atoms l=3 and l=4 each move by 2 positions $(a_{3,1} = a_{4,1} = 1, 2^1 = 2)$, and finally at k=2, only atom l=5 moves by 4 positions $(a_{5,2} = 1, 2^2 = 4)$, as all other bits are 0, and therefore all other $a_{l,2} = 0$. In some embodiments, during at least one operation, such as k=0 shown in FIG. 2, of the sequence of operations, at least two of the plurality of atoms, such as atoms l=3 and l=4, are simultaneously moved using the scanner.

TABLE 1

| l | y(l) | $d_l$ = y(l)-l | $d_l$ (binary) |
|---|---|---|---|
| 1 | 1 | 0 | 000 |
| 2 | 2 | 0 | 000 |
| 3 | 6 | 3 | 011 |
| 4 | 7 | 3 | 011 |
| 5 | 9 | 4 | 100 |

Figure 3:
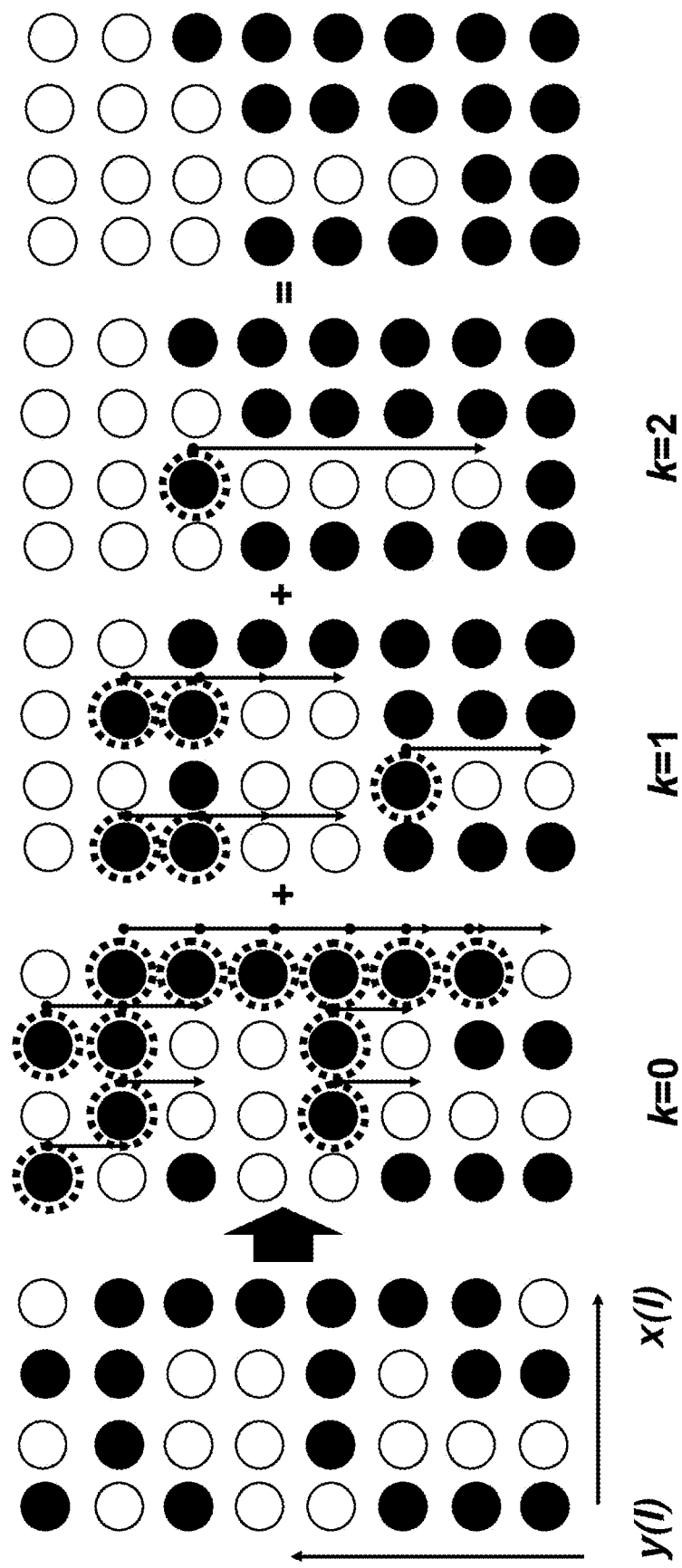
FIG. 3 schematically illustrates arranging multiple columns of atoms in close-packed arrays in accordance with one or more embodiments.

According to some embodiments, the process can be applied simultaneously to multiple columns, as shown in FIG. 3, moving atoms l by the number of positions $d_l$ listed in Table 2.

TABLE 2

| Column | l | y(l) | $d_l$ = y(l)-l | $d_l$ (binary) |
|---|---|---|---|---|
| 1 | 1 | 1 | 0 | 000 |
| 1 | 2 | 2 | 0 | 000 |
| 1 | 3 | 3 | 0 | 000 |
| 1 | 4 | 6 | 2 | 010 |
| 1 | 5 | 8 | 3 | 011 |
| 2 | 1 | 4 | 3 | 011 |
| 2 | 2 | 7 | 5 | 101 |
| 3 | 1 | 1 | 0 | 000 |
| 3 | 2 | 2 | 0 | 000 |
| 3 | 3 | 4 | 1 | 001 |
| 3 | 4 | 7 | 3 | 011 |
| 3 | 5 | 8 | 3 | 011 |
| 4 | 1 | 2 | 1 | 001 |
| 4 | 2 | 3 | 1 | 001 |
| 4 | 3 | 4 | 1 | 001 |
| 4 | 4 | 5 | 1 | 001 |
| 4 | 5 | 6 | 1 | 001 |
| 4 | 6 | 7 | 1 | 001 |

The resulting close-packed configuration can subsequently be close-packed in the other dimension x(l), as shown in FIG. 4. As demonstrated below, atom l+1 does not move past nor occupy the same position in an array (i.e., collide with) atom l in any move. Consider the first atom from the bottom (indexed by l) at location y(l) that has to move a finite distance at k=0. This would be l=3 at location y(l)=6 shown in FIG. 2. The camera image shows that atom l must move to location n<y(l) in the close-packed array by distance $d_l$=y(l)-n, which can be expressed as $d_l=\Sigma_{k=0,1} a_{l,k}2^k$ where $a_{l,k} \in \{0,1\}$ for all l, k. For FIG. 2, that distance is $d_3$=6-3=3. Consider the next-higher atom l+1 at position y(l+1)>y(l), which has to move to location n+1 over distance $d_{l+1}$=y(l+1)-(n+1). For FIG. 2, that distance is $d_4$=7-4=3. Note that for a close-packed array, n=1.

Start from k=0.

There are four possible values for $(a_{l,k}, a_{l+1,k})$:

$(a_{l,k}, a_{l+1,k})$=(0, 0): no movement, and therefore no collision;

$(a_{l,k}, a_{l+1,k})$=(1, 1): both atoms l and l+1 move down, and therefore no collision;

$(a_{l,k}, a_{l+1,k})$=(1, 0): only atom l moves down, and therefore no collision with atom l+1, and by assumption y(l)-1 is unoccupied, so atom l has room to move;

$(a_{l,k}, a_{l+1,k})$=(0, 1): Consider the two possibilities for movement of atom l+1:

a. If y(l+1)≤y(l)+$2^k$, which for k=0 means that y(l+1)=y(l)+1 (i.e., atoms l and l+1 are next to one another), leading to $d_{l+1}$=y(l+1)-(l+1)=y(l)+1-l-1=y(l)-l=$d_l$, and therefore $a_{l+1,0}=a_{l,0}$, which is a contradiction of the (0, 1) proposition; or b. If y(l+1)>y(l)+$2^k$, then there is room above atom l for atom l+1 to move, and therefore no collision.

Now consider the new distances $d_l$ after k=0 for atoms l and l+1. Notice that only the least significant bit (k=0 bit) changed to $a_{l,0}$=0 and $a_{l+1,0}$=0 for atoms l and l+1, respectively, and all other bits remained unchanged. For example, as shown in FIG. 2, $d_3$ and $d_4$ changed from both being 011 at the start (see Table 1) to both being 010 (6-4=5-3=2=$2^1$) after k=0.

Now proceed to k=1.

Again, there are four possibilities for $(a_{l,k}, a_{l+1,k})$, but again, the only one that could possibly produce a collision is $(a_{l,1}, a_{l+1,1})$=(0,1). Again, consider the two possibilities for movement of atom l+1:

a. If y(l+1)≤y(l)+$2^k$, then either atoms l and l+1 are next to one another, which means that their positions are y(l+1)=y(l)+1, leading to $d_{l+1}=d_l$, as shown above, and therefore $a_{l+1,1}=a_{l,1}$, which is a contradiction of the (0, 1) proposition, or atoms l and l+1 are separated by a number of positions smaller than $2^k$, in this instance separated by 1 position, which means that there would need to be a shift by atom l+1 for that number of positions, meaning that for a less significant bit j<k, here j=0, $a_{l+1,j}$=1, which is a contradiction of the change of the least significant bit to 0 after k=0 as described above.

b. If y(l+1)>y(l)+$2^k$, then there is room above atom l for atom l+1 to move, and therefore no collision.

Now consider the new distances $d_l$ after k=1 for atoms l and l+1. Notice that only the k=1 bit changed to $a_{l,1}$=0 for atoms l and l+1, and all other bits remained unchanged. For example, as shown in FIG. 2, $d_3$ and $d_4$ changed from both being 010 after k=0 to both being 000 after k=1. The process can be repeated for k=2, 3, 4 . . . , without collisions.

Figure 5A:
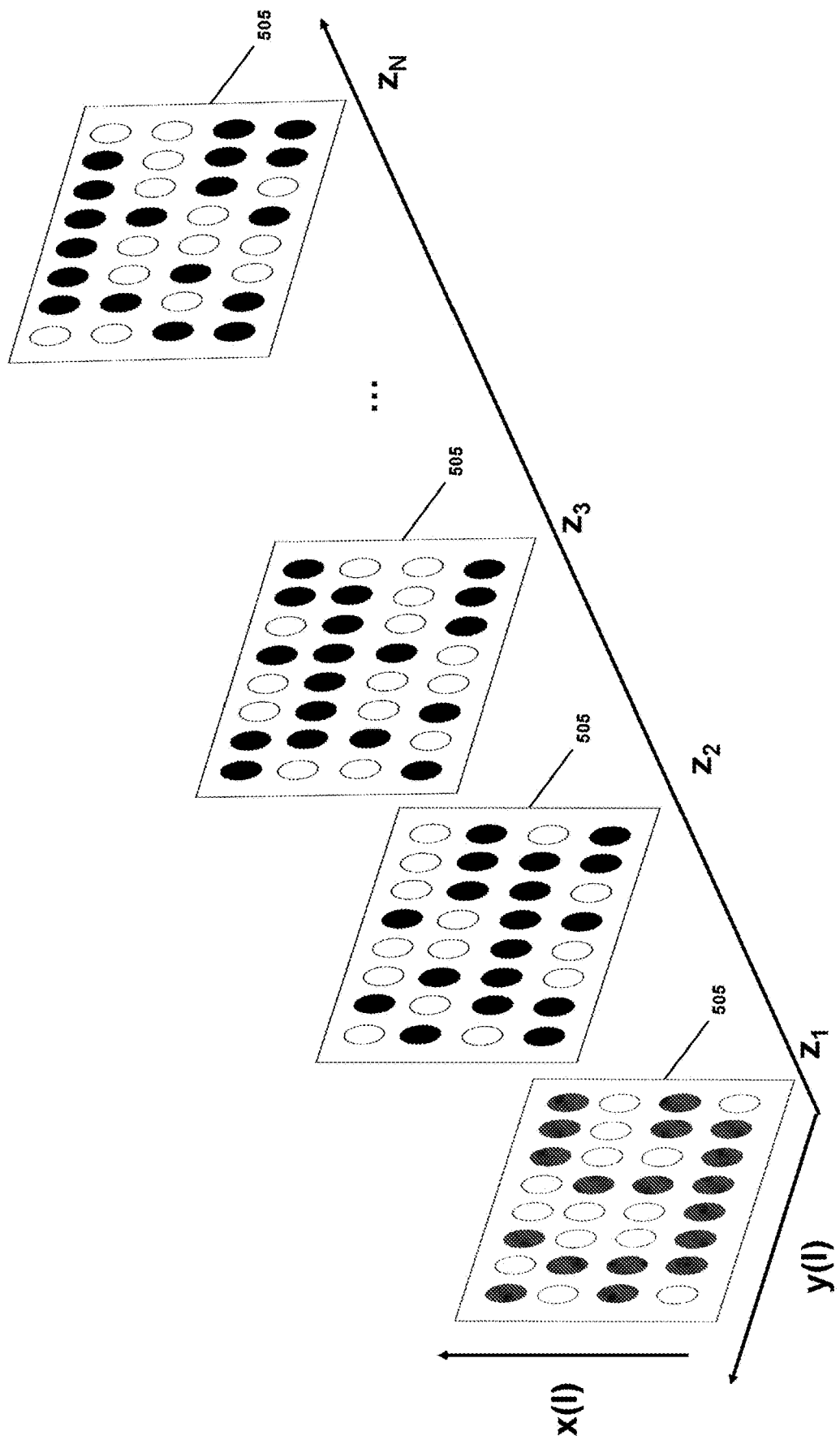
Figure 5B:
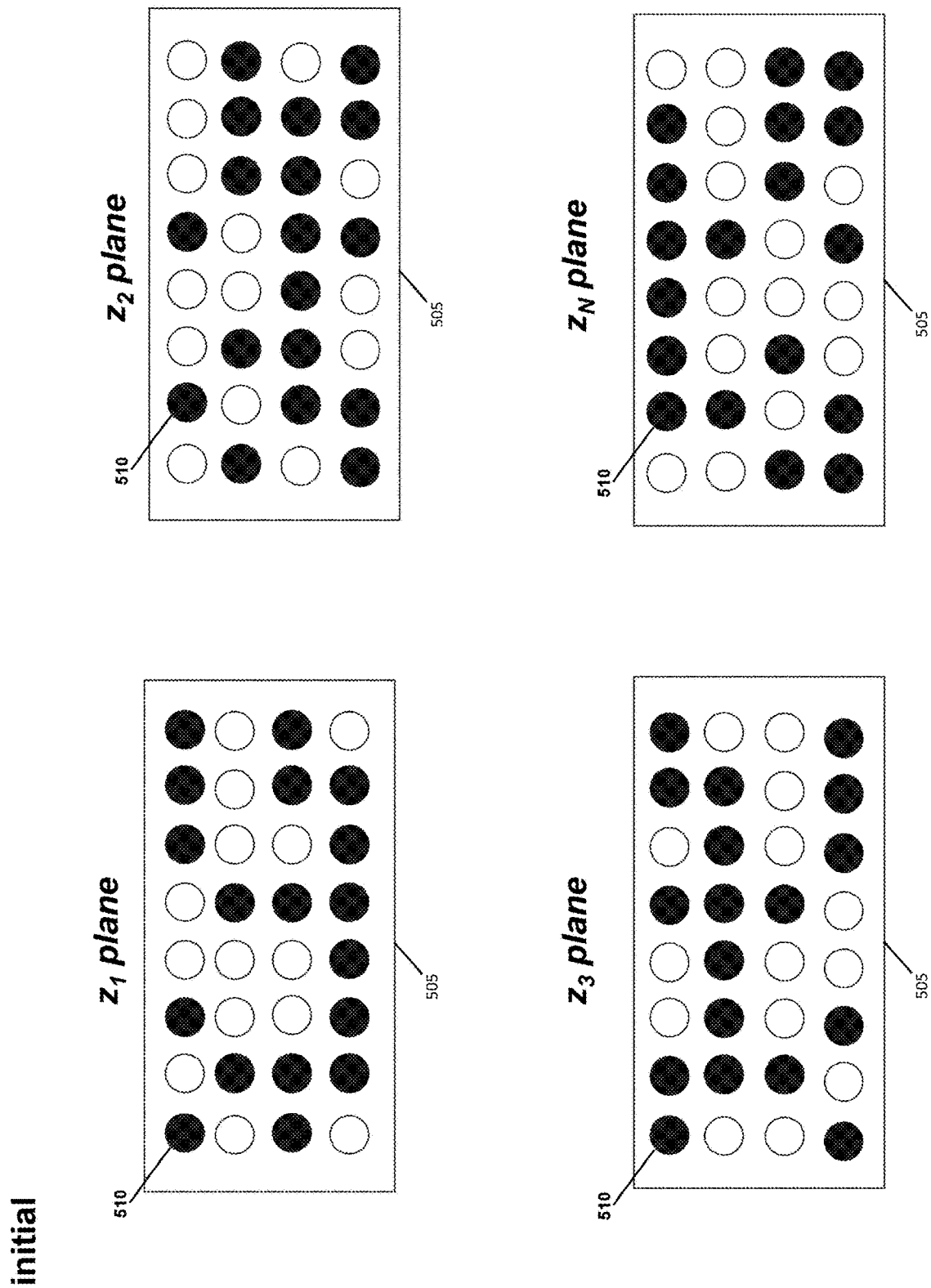
Figure 5C:
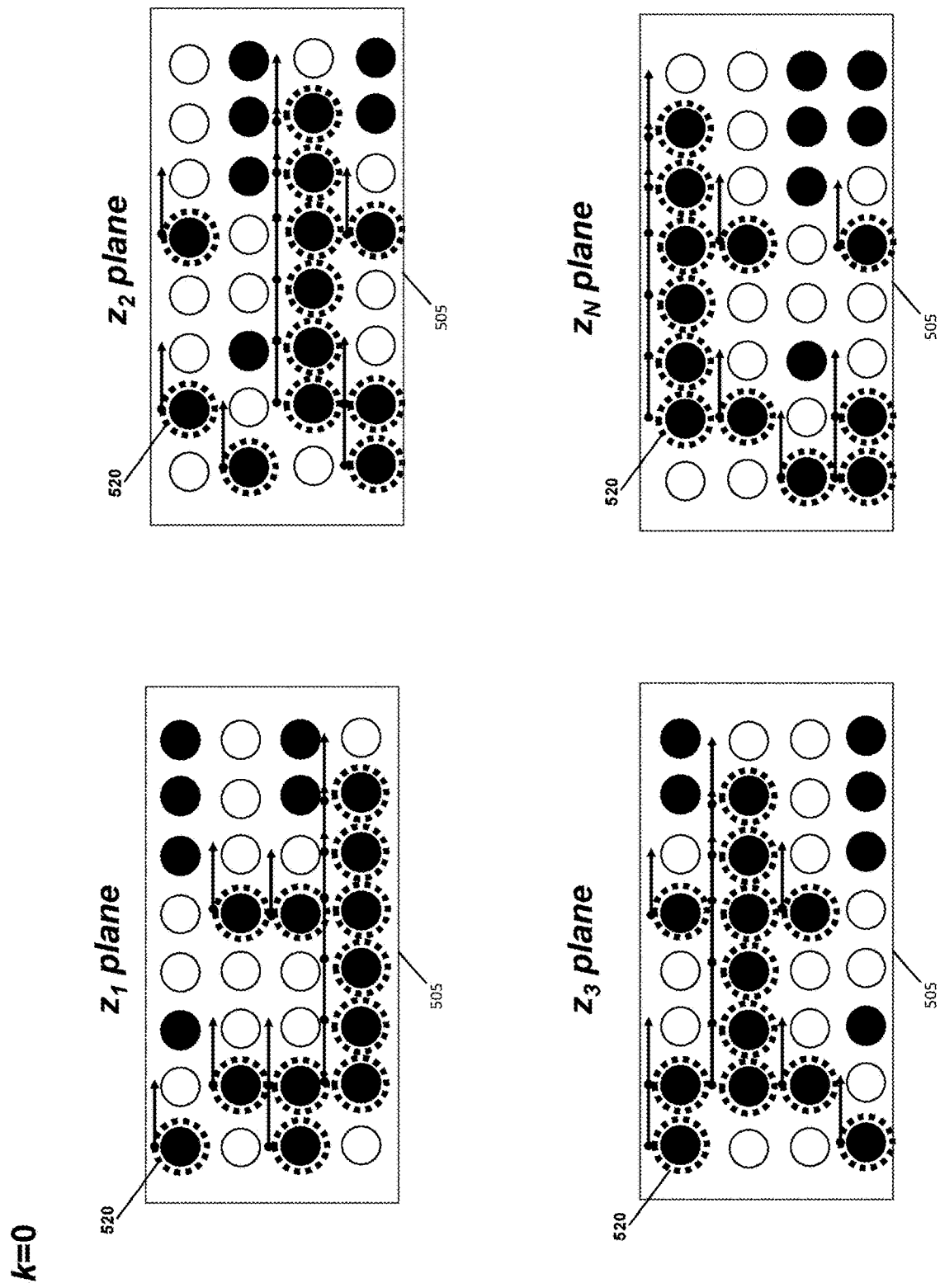

Moving atoms from initial positions within the 3-dimensional space, such as the 4 regularly spaced n-position arrays 505, $Z_1$, $Z_2$, $Z_3$, and $Z_N$, shown in FIGS. 5A and 5B, to close-packed positions along the y axis (n=8) includes the 3 steps, k=0 shown in FIG. 5C, k=1 shown in FIG. 5D, and k=2 shown in FIG. 5E, to the close-packed configuration shown in FIG. 5F. Only one atom 510 is labeled in each n-position array 505 in FIGS. 5B and 5F for clarity, and only one switchable optical trap 520 is labeled in FIGS. 5C-5E for clarity. The process can be applied simultaneously to multiple planes with multiple columns, as shown in FIGS. 5A-5F. The atoms can be close-packed along the x axis in subsequent operations of the scanner, and along the y axis of a different n-position array 505 selected by subsequent operations of, for example, a focus tunable lens.

Figures 6A, 6B, 6C, 6D:
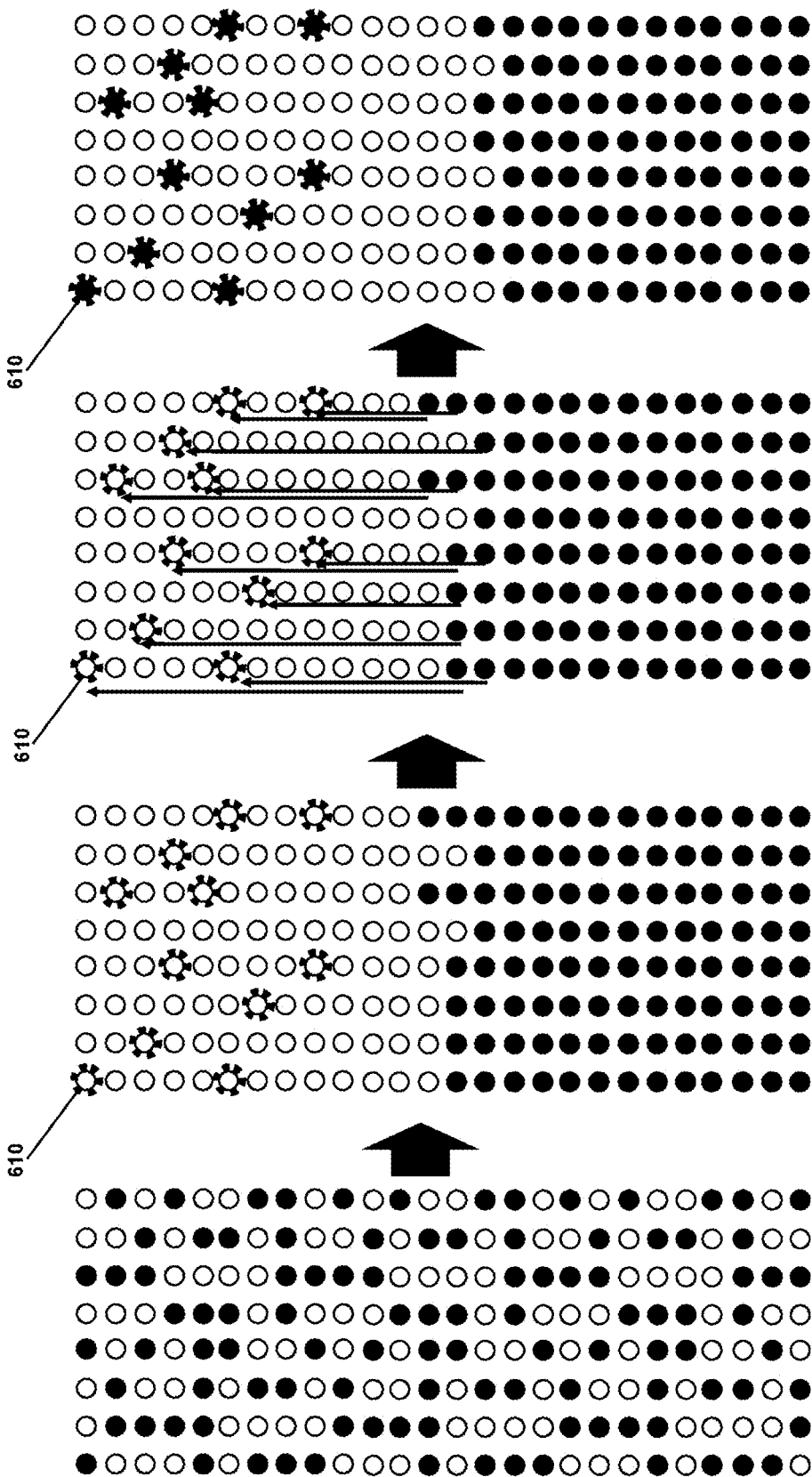
FIGS. 6A-6D schematically illustrate arranging multiple columns of atoms into close-packed arrays and unpacking them into target patterns in accordance with one or more embodiments.
Figure 7A:
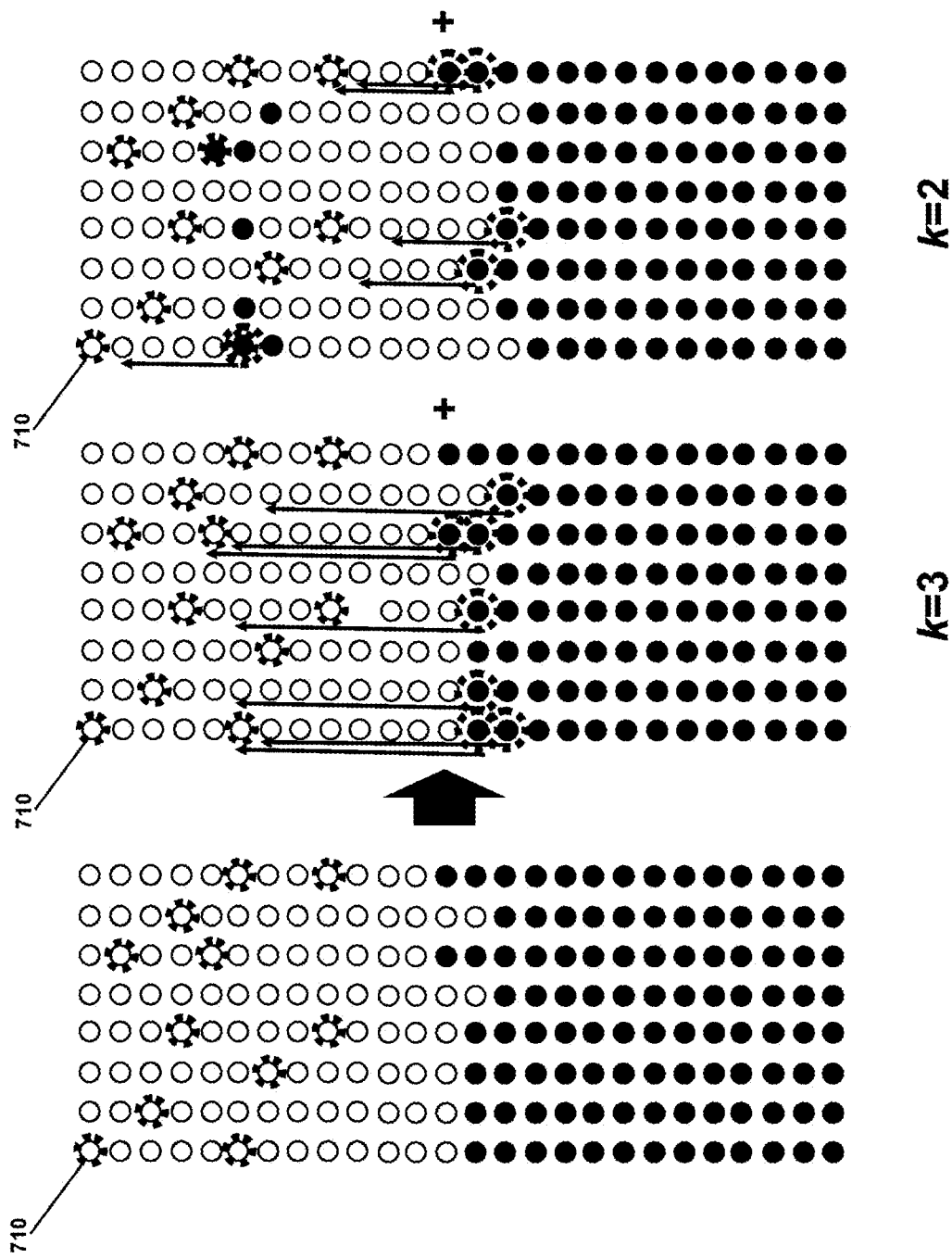
FIGS. 7A-7B schematically illustrate unpacking multiple columns of atoms into target patterns in accordance with one or more embodiments.
Figure 7B:
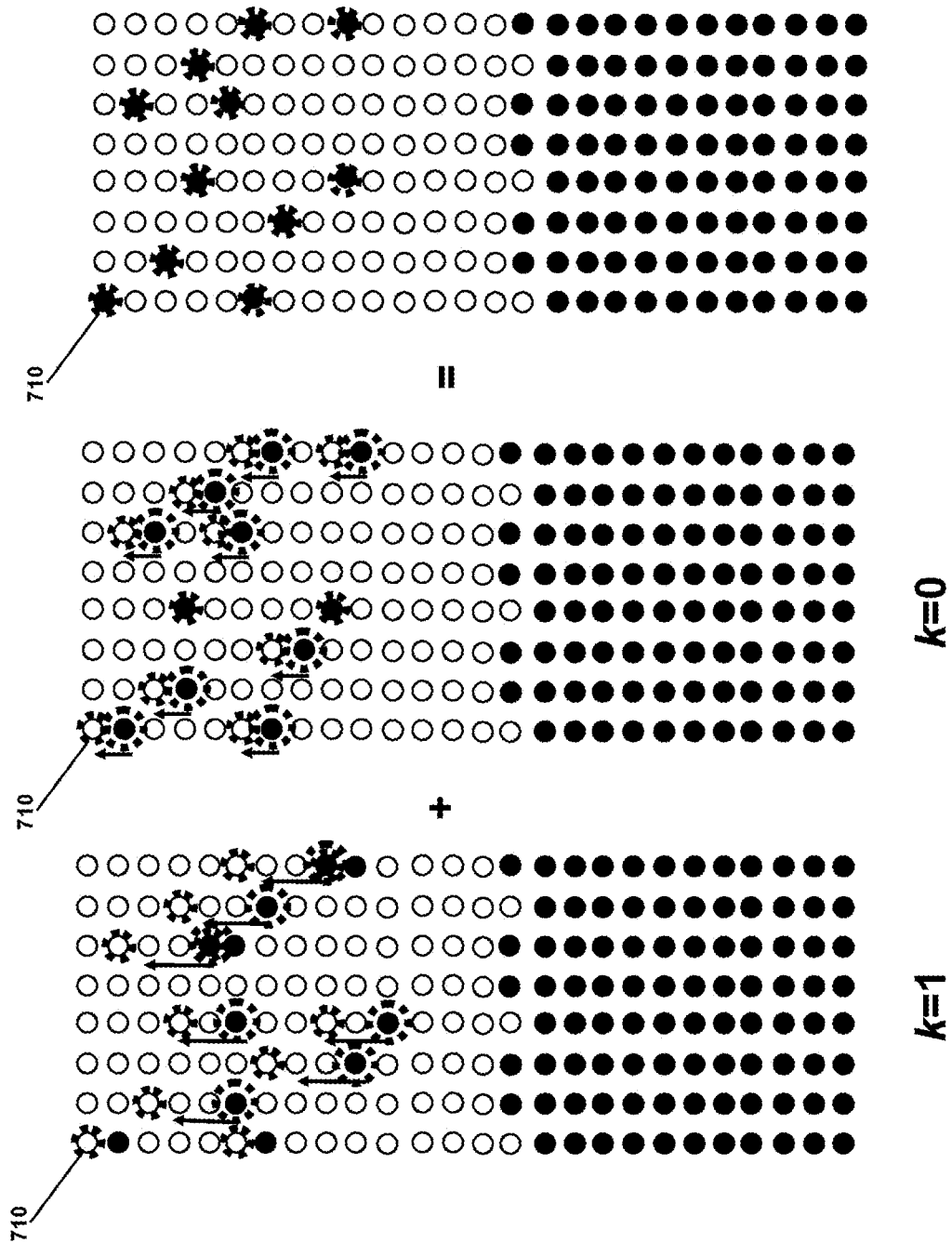

To produce an arbitrary arrangement of atoms from a randomly distributed pattern in a regularly spaced n-position array, such as the pattern shown in FIG. 6A, the method can further include, by the at least one controller, determining, based on the sensor data generated by the sensor, a number of positions to move each of a plurality of atoms captured within the array of switchable optical traps to sort the atoms into the desired configuration within the regularly spaced n-position array, and generating, based on the determined number of positions for each of the plurality of atoms, a sequence of operations in which the plurality of atoms is moved using the scanner from close-packed positions in the 3-dimensional space to target positions in the 3-dimensional space, providing target positions t(l) for atoms l to form the arbitrary pattern within the n-position array shown in FIG. 6B where only one target position 610 is labeled for clarity, close-packing the array, as shown in FIG. 6B, using the method described above and shown in FIG. 3, imaging positions y(l) of atoms l, counting from the top within the n-position close-packed array, computing a number of positions $f_l=y(l)-t(l)$ that each atom l is to be moved within the n-position array to form the arbitrary pattern, as shown in FIG. 6C, expressing $f_l$ as an m-bit binary number, where $m=\text{round}(\log_2(f_l))$, as shown in Table 3, and, as shown in FIGS. 7A and 7B, moving each atom l by a number of positions $f_{l,k}=a_{l,k}2^k$, wherein $a_{l,k} \in \{0,1\}$ is the bit k in the binary expression of $f_l$ for each atom l, and $k=\text{round}(\log_2(f_l))$, starting at k=3 in the example shown in FIG. 7A, and repeating the moving of each atom l, decrementing k=k−1 each time, until k=0, to form the arbitrary pattern shown in FIGS. 6D and 7B. FIGS. 6C, 6D, 7A, and 7B also show only one target position 610, 710 labeled for clarity, the other target positions in FIGS. 6B-6D), and 7A-7B shown as dashed targets. In this way, the number of positions for each of the plurality of atoms can be expressed as a binary number, and the at least one controller can be configured to generate the sequence of operations by, for each atom of the plurality of atoms, interpreting each bit of the binary number from most significant bit to least significant bit as instructions to move, or not move, the atom based on whether the bit is a one or a zero, respectively. As shown in FIG. 7A, during at least one operation of the sequence of operations, at least two of the plurality of atoms are simultaneously moved using the scanner. The process can be applied simultaneously to multiple planes with multiple columns in the 3-dimensional arrangement of regularly spaced n-position arrays described above.

TABLE 3

| Column | l | t(l) | y(l) | $f_l$ = y(l)-l | $f_l$ (binary) |
|---|---|---|---|---|---|
| 1 | 1 | 1 | 14 | 13 | 1101 |
| 1 | 2 | 6 | 15 | 9 | 1001 |
| 2 | 1 | 3 | 14 | 11 | 1011 |
| 3 | 1 | 7 | 14 | 7 | 0111 |
| 4 | 1 | 4 | 14 | 10 | 1010 |
| 4 | 2 | 9 | 15 | 6 | 0110 |
| 5 | 0 | 0 | 0 | 0 | 0000 |
| 6 | 1 | 2 | 13 | 11 | 1011 |
| 6 | 2 | 5 | 14 | 9 | 1001 |
| 7 | 1 | 4 | 15 | 11 | 1011 |
| 8 | 1 | 6 | 13 | 7 | 0111 |
| 8 | 2 | 9 | 14 | 5 | 0101 |

Figure 8D:
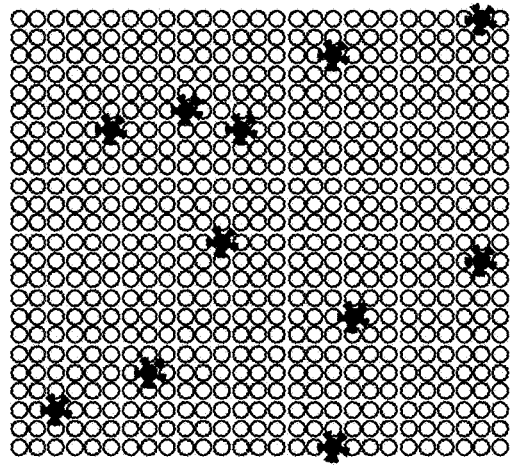
Figure 8E:
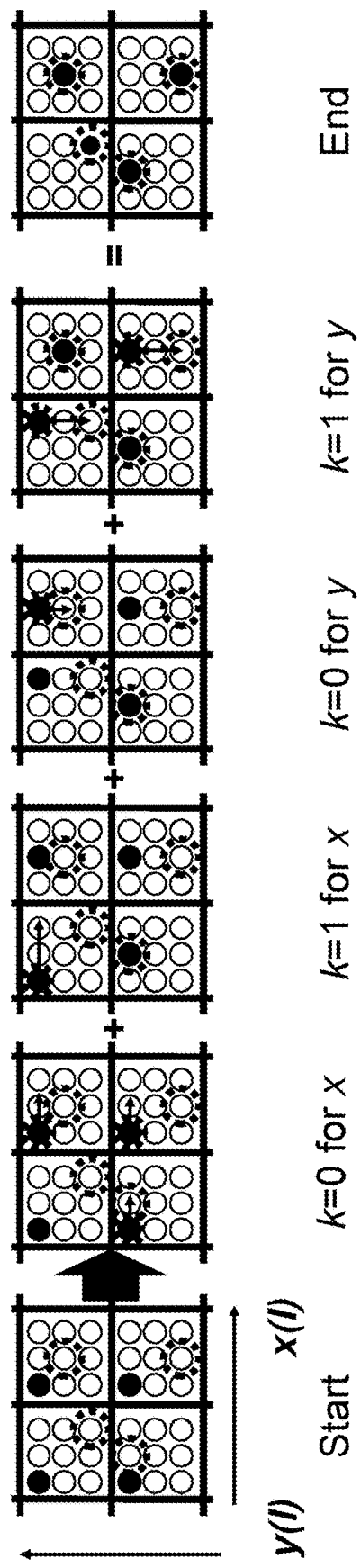

The method can further include generating an h-position array of switchable optical traps having a higher resolution than the n-position array of switchable optical traps by determining, by the at least one controller, based on the sensor data generated by the sensor, a number of positions to move each of a plurality of atoms captured within the array of switchable optical traps to sort the atoms into the desired configuration within the regularly spaced n-position array, and generating, based on the determined number of positions for each of the plurality of atoms, a sequence of operations in which the plurality of atoms is moved using the scanner from initial positions in the 3-dimensional space to target positions in the regularly spaced h-position array of switchable high-resolution optical traps having a higher resolution than the n-position array within the 3-dimensional space. The method begins by packing atoms l into close-packed arrays and then unpacking them into a low-resolution arbitrary pattern shown in FIG. 8A using the packing and unpacking steps described above. The method then provides target positions $t_2(l)$ for atoms l to form a high-resolution arbitrary pattern, as shown in FIG. 8A where only one high resolution target position 810 is labeled for clarity, and defining (ΔD by ΔD) sub-areas 815 based on the n-position array, each sub-area 815 defined by horizontal lines 820 and vertical lines 830, only one of each labeled in FIG. 8B for clarity, and each sub-area 815 containing at most only one atom l, and generating a high-resolution h-position array with a finer grid spacing Δd (d<D) matching the high-resolution arbitrary pattern, as shown in FIG. 8C. The method then includes computing a number of positions g(l) that each atom l is to be moved along x- and y-directions within each sub-area 815 in the h-position array to form the high-resolution arbitrary pattern in the example shown in FIG. 8D, expressing g(l) as a u-bit binary number, where $u=\text{round}(\log_2(h-1))$, and moving each atom l by a number of positions $g_{l,k}=a_{l,k}2^k$, wherein $a_{l,k} \in \{0,1\}$ is the bit k in the binary expression of g(l) for each atom l, and repeating k times the moving of each atom l, incrementing k=k+1 each time from k=0. An example of forming a high-resolution arbitrary pattern in four sub-areas along x- and y-directions is shown in FIG. 8E. In this way, the number of positions for each of the plurality of atoms can be expressed as a binary number, and the at least one controller can be configured to generate the sequence of operations by, for each atom of the plurality of atoms, interpreting each bit of the binary number from least significant bit to most significant bit as instructions to move, or not move, the atom based on whether the bit is a one or a zero, respectively. As shown in FIG. 8E, during at least one operation of the sequence of operations, at least two of the plurality of atoms are simultaneously moved using the scanner. The process can be applied simultaneously to multiple planes with multiple columns in a 3-dimensional arrangement of regularly spaced h-position arrays, similar to the 3-dimensional arrangement of regularly spaced n-position arrays described above.

Figure 9A:
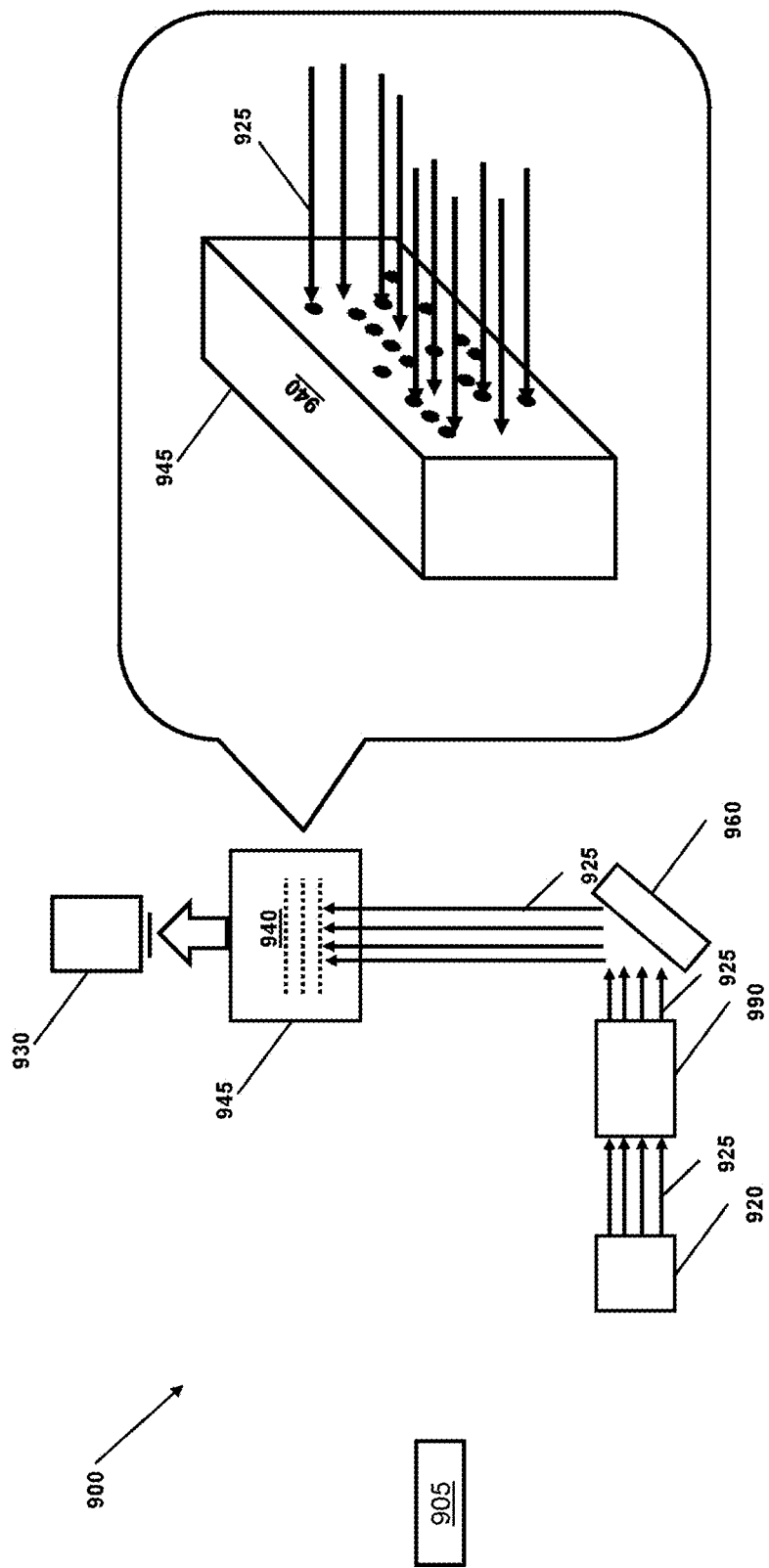
FIG. 9A schematically illustrates a system for arranging atoms in arrays in accordance with one or more embodiments.
Figure 9B:
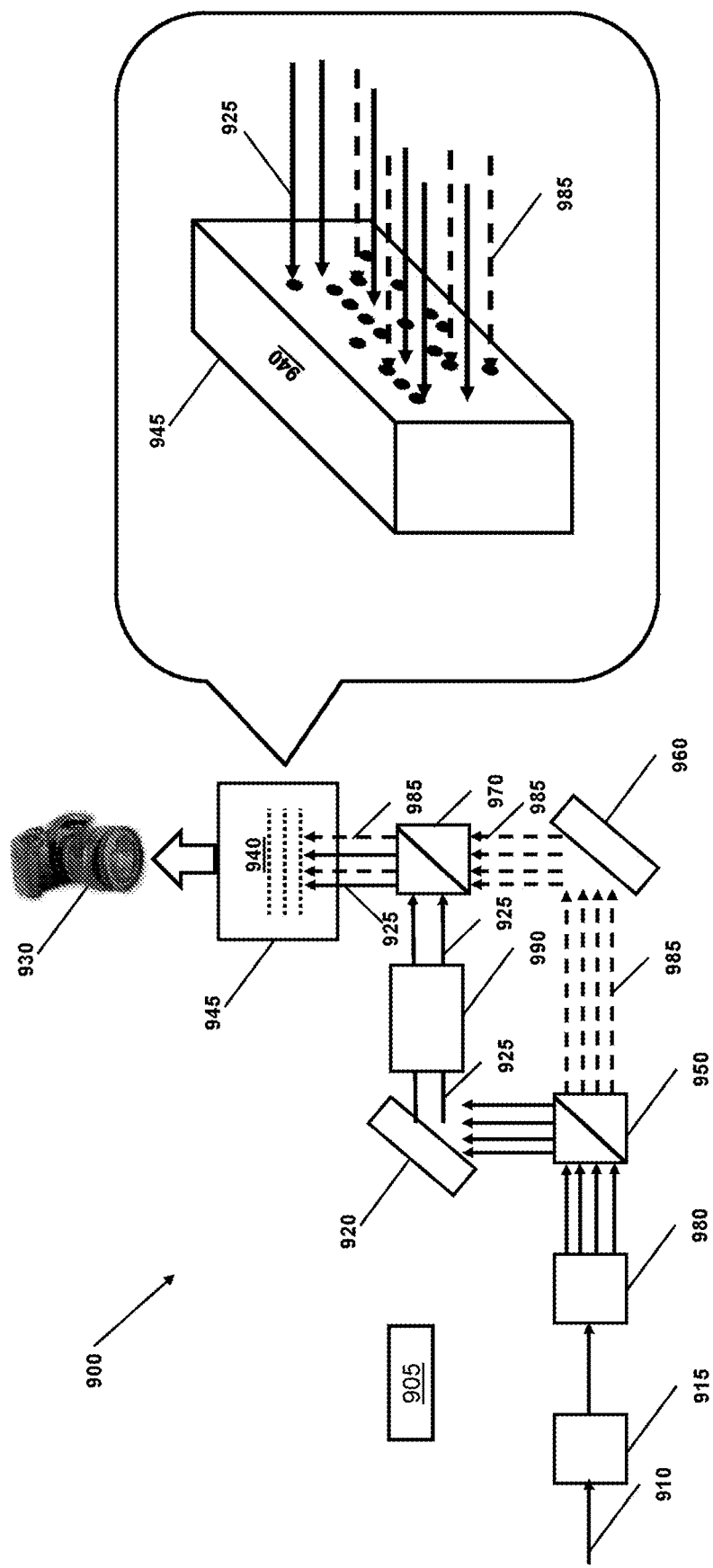
FIG. 9B schematically illustrates another system for arranging atoms in arrays in accordance with one or more embodiments.
Figure 9C:
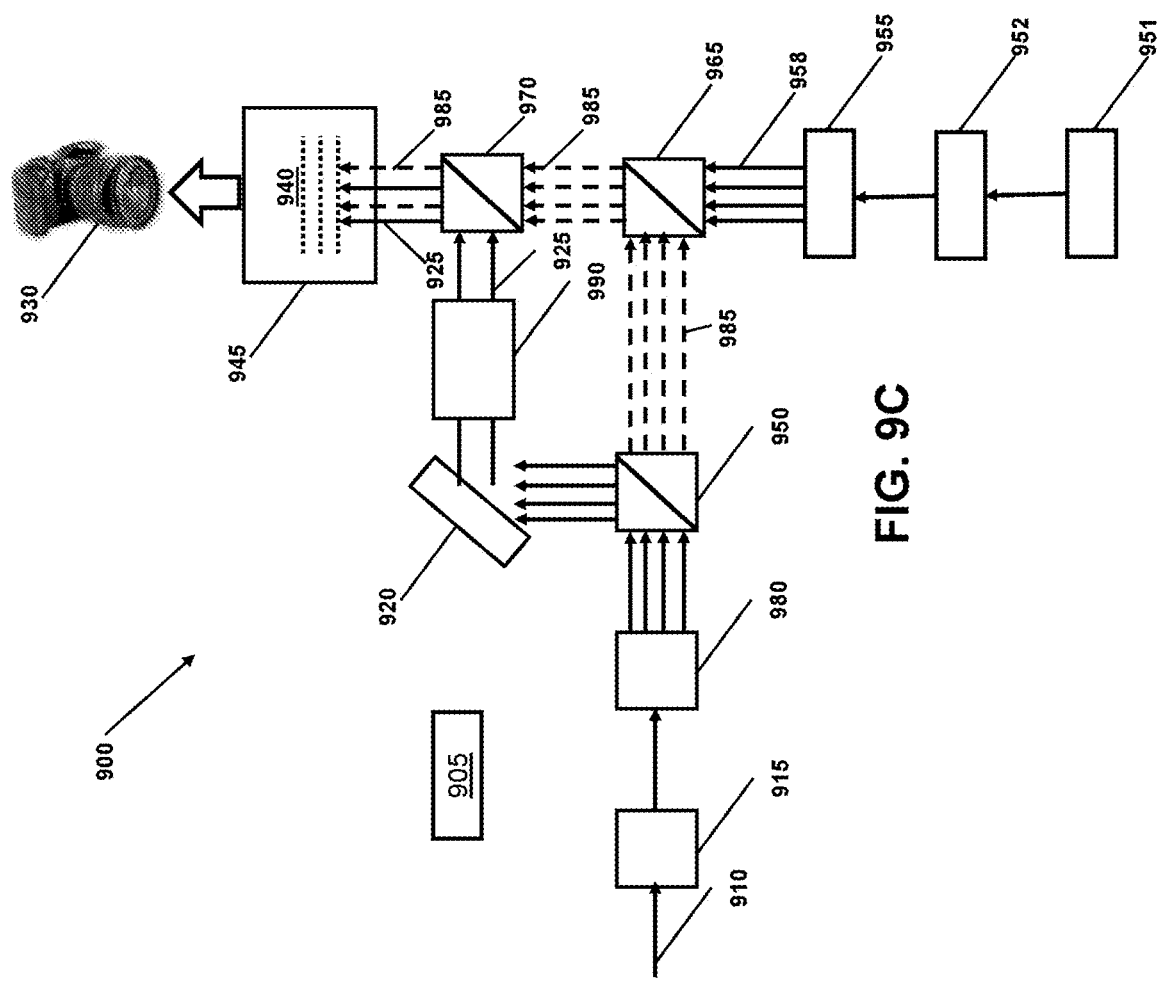
FIG. 9C schematically illustrates yet another system for arranging atoms in arrays in accordance with one or more embodiments.

To implement the methods described above in accordance with one or more embodiments in a system 900 for arranging atoms within a 3-dimensional space, the system 900 shown in FIGS. 9A, 9B, and 9C includes an optical system 920 operable to produce a plurality of switchable optical traps 925 within the 3-dimensional space 940 inside atomic vapor cell 945. The optical system 920 can comprise various types of spatial light modulators (SLMs) 920, such as intensity or phase SLMs, that can produce the plurality of switchable optical traps 925. Suitable SLMs 920 include digital micromirror devices (DMDs) that typically have millions of pixels with high on-off contrast, thereby producing a large number of beams 925. In some embodiments, a suitable SLM 920 can be a ferroelectric liquid-crystal (FLC) SLM, a liquid-crystal-on-silicon (LCOS) SLM, a multiple quantum well array, a deformable micromirror array, an array of surface acoustic wave (SAW) transducers, an array of acousto-optic deflectors (AODs), a magneto-optic SLM, or a tunable microcavity array. Suitable SLMs can be obtained from Digital Light Innovations (e.g., Model V-7001, Austin TX), Ajile Light Industries (e.g., Model AJD-4500, Ottawa, Ontario, CA), Hamamatsu (e.g., Model X13138, Bridgewater NJ), Santec (e.g., Model SLM-100, Hackensack NJ), Holoeye Photonics (e.g., Model GAEA-2, Berlin Germany), or Meadowlark Optics (e.g., 1920×1152 SLM, Frederick, CO).

In some embodiments, the optical system 920 is configured to receive an input laser beam as described further below. In other embodiments, a static optical focus array is generated by directing a laser beam through, for example, a microlens array, diffractive optics, or additional phase SLMs (not shown) as described in PCT Application No. PCT/US2020/019309, entitled LARGE-SCALE UNIFORM OPTICAL FOCUS ARRAY GENERATION WITH A PHASE SPATIAL LIGHT MODULATOR, filed on Feb. 21, 2020, which is hereby incorporated by reference in its entirety. The static optical focus array is imaged onto the SLM 920 that switches individual optical foci on and off to produce the switchable optical traps 925, thereby enabling more efficient use of limited laser power.

The system 900 further includes a sensor 930 configured to detect atoms within the plurality of switchable optical traps 925. Suitable sensors 930 include several optical detectors 930, including single-pixel and imaging detectors that are capable of detecting atoms within the plurality of switchable optical traps 925. Laser-scanning imaging techniques, wherein a focused laser beam is scanned across the 3-dimensional space 940, can be used with a single-pixel photodetector 930. Alternatively, photo-detector arrays 930 (e.g., avalanche photo-diode arrays) can be used to detect atoms within the plurality of switchable optical traps 925. In some embodiments, an optical camera 930 (e.g., an EM-CCD or CMOS optical camera) can be used to detect atoms within the plurality of switchable optical traps 925.

The system 900 further includes a scanner 990 operable to simultaneously move multiple atoms within the plurality of switchable optical traps 925. In certain embodiments, the scanner 990 can be an acousto-optic deflector (AOD), an electro-optic deflector (EOD), a focus tunable lens, or a mirror galvanometer. Suitable scanners can be obtained from Cambridge Technology (e.g., Lightning II Digital, Bedford MA), or Conoptics (e.g., Model 311A, Danbury CT).

The system 900 further includes at least one controller 905 configured, as described further below, to operate the optical system 920 and the scanner 990 to sort atoms within the plurality of switchable optical traps 925 into a desired configuration of atoms, said operation of the optical system 920 and the scanner 990 being based at least in part on sensor data generated by the sensor 930 detecting atoms within the plurality of switchable optical traps 925.

In accordance with one or more embodiments, as shown in FIGS. 9B and 9C, the optical system 920 produces the plurality of switchable optical traps 925 by controlling the intensity of a large number of beams produced by reflecting an s-polarized laser beam 910 from a first spatial light modulator (SLM) 920 after the laser beam 910 passes through an electro-optic (EO) polarization rotator 915, also referred to herein as a Pockels cell. The optical system 920 can comprise various types of spatial light modulators (SLMs) 920, such as intensity or phase SLMs, that can produce the plurality of switchable optical traps 925. Suitable SLMs 920 include digital micromirror devices (DMDs) that typically have millions of pixels with high on-off contrast, thereby producing a large number of beams 925. In some embodiments, a suitable SLM 920 can be a ferroelectric liquid-crystal (FLC) SLM, a liquid-crystal-on-silicon (LCOS) SLM, a multiple quantum well array, a deformable micromirror array, an array of surface acoustic wave (SAW) transducers, an array of acousto-optic deflectors (AODs), a magneto-opdic SLM, or a tunable microcavity array. Suitable SLMs can be obtained from the manufacturers described above. The array of beams is split by a polarizing beam splitter (PBS) 950 at a ratio controlled by the upstream EO modulator 915. The s-polarized arm 925 is deflected by a scanner 990 and then reflected off beam splitter 970 before being imaged onto the 3-dimensional space 940 inside atomic vapor cell 945. Optionally, the p-polarized arm 985 of the beams is reflected off a second SLM 980 and reflected by the mirror 960 and then imaged on the 3-dimensional space 940 inside atomic vapor cell 945. The second SLM 980 can be followed by at least one beam splitter stage to create a copy of the n-position array of static optical traps created by the second SLM 980, as described further below. In some embodiments, the second SLM 980 can be an intensity SLM. In other embodiments, the second SLM 980 can be a phase SLM. In certain embodiments, the second SLM 980 can be a diffractive optical element (DOE), a ferroelectric liquid-crystal (FLC) SLM, a liquid-crystal-on-silicon (LCOS) SLM, a multiple quantum well array, a deformable micromirror array, an array of surface acoustic wave (SAW) transducers, an array of acousto-optic deflectors (AODs), a magneto-optic SLM, or a tunable microcavity array. Suitable SLMs can be obtained from the manufacturers described above. In certain embodiments, the scanner 990 can be an acousto-optic deflector (AOD), an electro-optic deflector (EOD), a focus tunable lens, or a mirror galvanometer. Suitable scanners can be obtained from the manufacturers described above. The beams 925 and 985 are directed into a cloud of cold atoms inside atomic vapor cell 945 to load them at random with atoms. A sensor 930, such as an optical camera 930, images the 3-dimensional space 940 to find the traps that contain single atoms within the n-position array of switchable optical traps 925 created by the first SLM 920, and the scanner 990 moves atoms by a number of positions as described further below. Optionally, the second SLM 980 traps atoms within static dipole traps 985 in the n-position array. The static dipole traps 985 have shallower trap potentials than the array of switchable optical traps produced by the first SLM 920, as described further below. Only one each of the switchable 925 and static 985 trap beams are labeled in FIGS. 9B and 9C for clarity. The use of s- and p-polarization for the first 920 and second 980 SLM, respectively, makes it possible to avoid optical interference between the switchable 925 and static 985 trap beam arrays.

Figure 11:
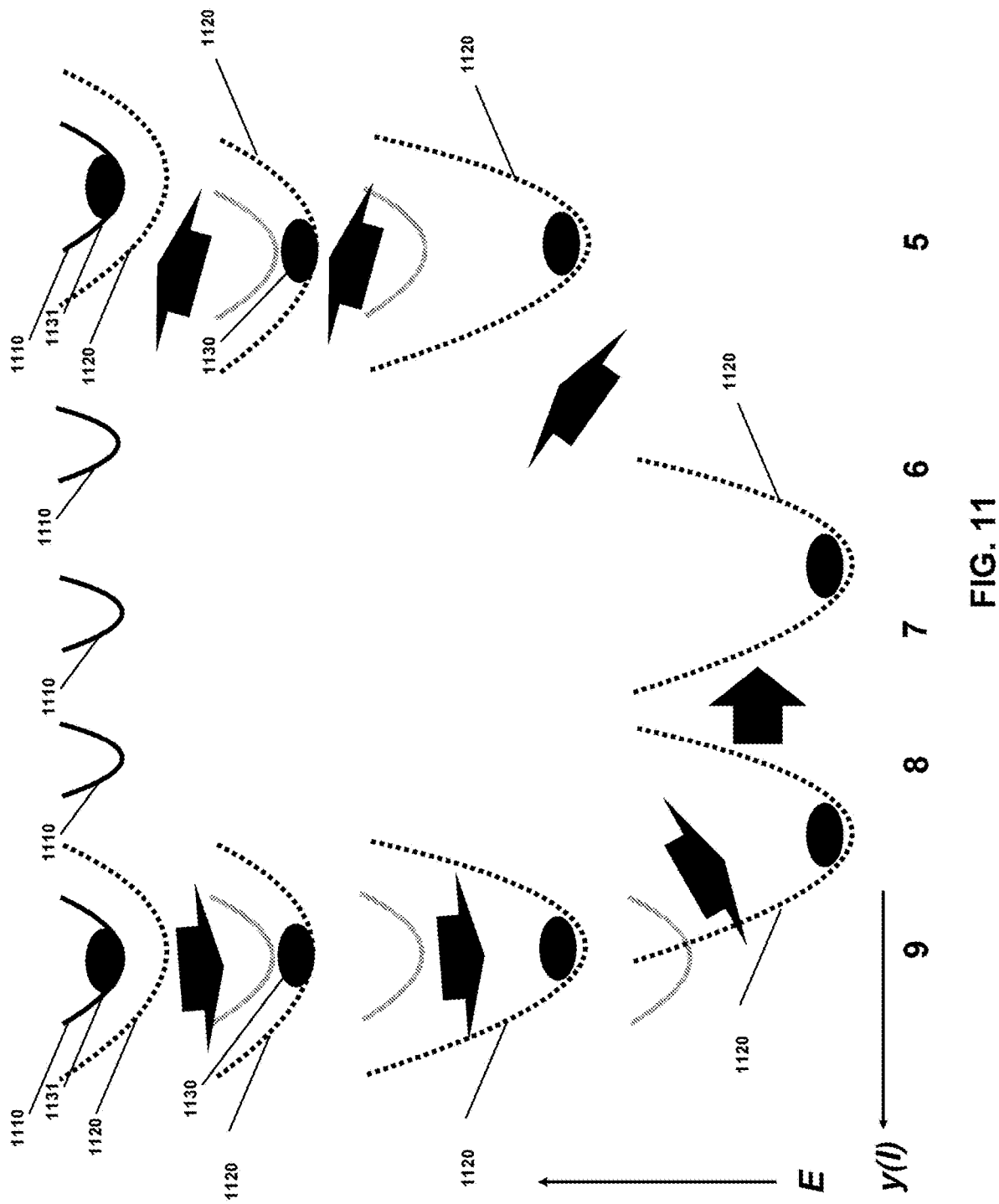
FIG. 11 schematically illustrates an energy diagram of atoms within static and dynamic dipole traps in accordance with one or more embodiments.

Turning back to FIG. 2, illustrating the move at k=2 using the elements shown in FIG. 9B, the system 900 for arranging atoms within a 3-dimensional space includes an optical system including the first spatial light modulator (SLM) 920 that generates a plurality of switchable optical traps 210, an example of a 1-dimensional array shown in FIG. 2, such as the n-position array of switchable optical traps 210, nine switchable optical traps 210 shown in FIG. 2 (n=9), with only the y(l)=9 switchable optical trap 210 labeled in FIG. 2 for clarity. The camera 930 images positions y(l) of atoms l within the n-position array. The controller 905 then operates the first SLM 920 to deactivate all the switchable optical traps except y(l)=9 switchable optical trap 220. As shown in FIG. 11, the atom 1130 is then adiabatically transferred between the switchable optical traps 1120 at the beginning and end of the move from y(l)=9 to y(l)=5. Adiabatic transfer, as used herein, means that the atom remains in its motional ground state during the transfer of the switchable optical trap 1120 between y(l)=9 and y(l)=5, by slowly changing the shape of the dipole trap potentials at a rate that is slow as compared to the trap frequency. As the scanner 990 translates the switchable optical trap 1120 from y(l)=9 to y(l)=5, the atom 1130 remains trapped in the switchable optical trap 1120. As long as the operation of the scanner 990 is accomplished in a time in a range of between about 10 µsec and about 100 µsec, the atoms l=1, 2, 3, and 4 remain stationary at positions y(l)=1, 2, 3, and 4 during the move of atom l=4, after which move the controller reactivates the switchable optical traps at y(l)=1, 2, 3, and 4 to again trap atoms l=1, 2, 3, and 4, as well as l=5. Optionally, as described above, the second SLM 980 traps atoms within static dipole traps 985 in the n-position array. Then, at y(l)=9, the Pockels cell 915 rotates the incident light polarization to direct more light to the switchable optical trap 1120, which makes the depth of the switchable optical trap 1120 deeper than the depth of the static dipole trap 1110. As shown in FIG. 11, the static dipole trap 1110 has a shallower trap potential than the switchable optical trap 1120. Given that the atom 1131 has a lower energy E when it is in a deeper trap, this results in adiabatically transferring the atom 1131 from the static dipole trap 1110 to the switchable optical trap 1120, with the atom there denoted as atom 1130. At y(l)=5, the atom 1130 in the switchable optical trap 1120 is adiabatically transferred back to the static dipole trap 1110, with the atom there denoted as atom 1131, by similarly directing more light into the static dipole trap 1110 with Pockels cell 915. Turning back to FIG. 2, the scanner 990 moves atoms l by a number of positions $d_l=y(l)-l$ within the n-position array, wherein $d_l$ is expressed as an m-bit binary number by controller 905, with m=round($\log_2(n-1)$), and the scanner 990 is configured to move atoms l stepwise by a number of positions $d_{l,k}=a_{l,k}2^k$, wherein $a_{l,k} \in \{0,1\}$ is the bit k in the binary expression of $d_l$ for each atom l, and k=0, 1, ..., m. If the first SLM 920 is a DMD that can capture many atoms to be moved simultaneously, then the scanner 990 (e.g., a galvanometer) moves all captured atoms l at the same time. For N atoms in 2N tweezer 1D beams forming switchable optical traps 210, the number of camera frames is n=round[$\log_2(N-1)$], and the required resolution of the scanner 990 is also n bits. If the array is a two-dimensional (2D) array, as shown in FIGS. 3 and 4, then the scanner 990 can be a pair of crossed (i.e., oriented at 90° with respect to each other) acousto-optic deflectors (AODs), a pair of crossed electro-optic deflectors (EODs), a mirror galvanometer and a focus tunable lens, or a pair of crossed mirror galvanometers that can move all atoms l in either x or y directions. If the array is a 3-dimensional array, as shown in FIGS. 5A-5F, then the scanner 990 can be a pair of mirror galvanometers and a focus tunable lens, a pair of acousto-optic deflectors (AODs) and a focus tunable lens, or a pair of electro-optic deflectors (EODs) and a focus tunable lens. Suitable mirror galvanometers can be obtained from Cambridge Technology (e.g., Lightning II Digital, Bedford MA). Suitable focus tunable lenses can be obtained from Optotune (Dietikon, Switzerland) or Applied Scientific Instrumentation (Eugene, OR).

Figure 12:
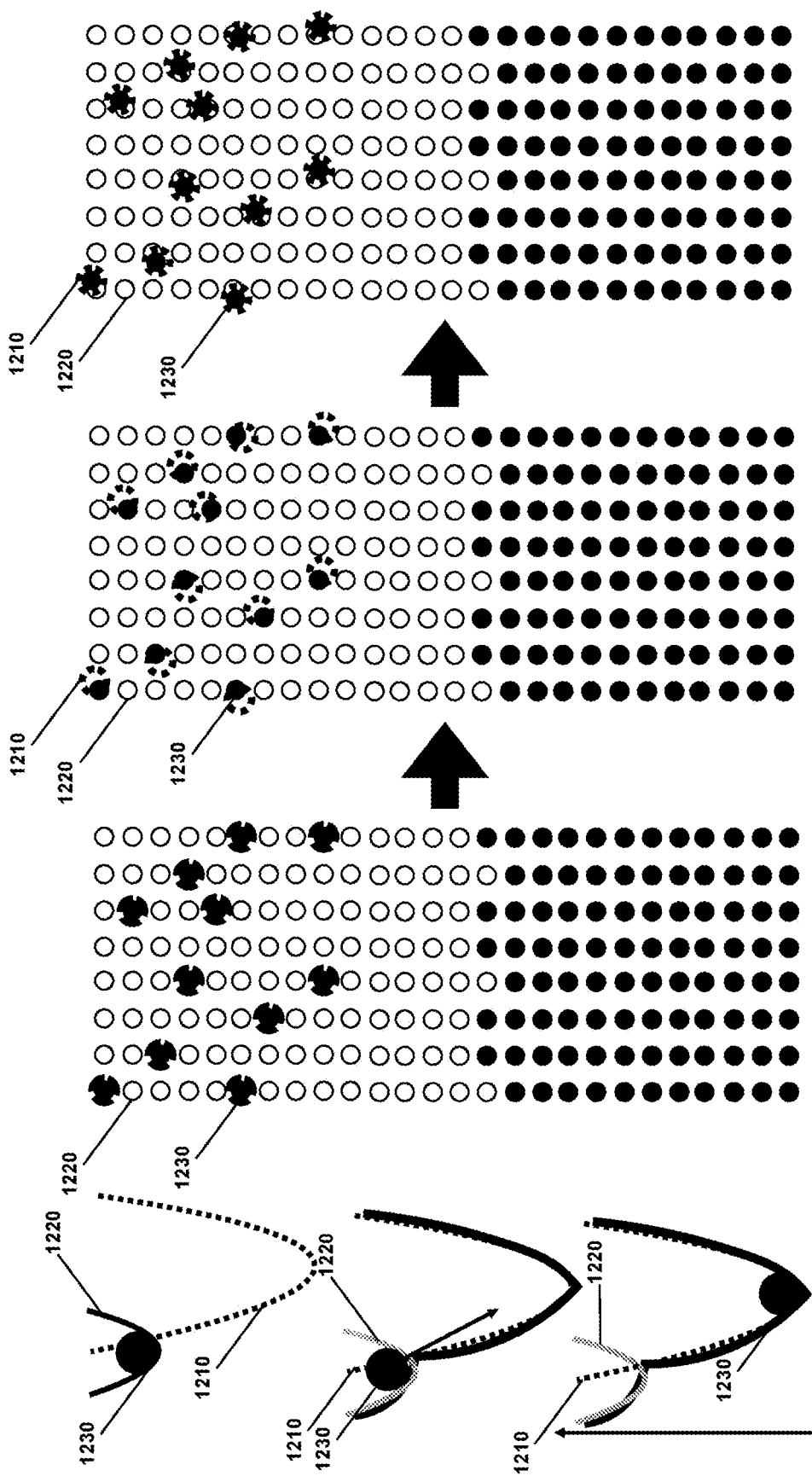
FIGS. 12A-12D schematically illustrate arranging atoms into target patterns of deeper static dipole traps in accordance with one or more embodiments.

In certain embodiments, as shown in FIG. 9C, the system 900 further includes a third SLM 955 that traps atoms within static dipole traps 958 that form a target pattern of static dipole traps that overlap with and have a deeper trap depth than a target pattern of static dipole traps 985 in the n-position array, as shown in FIGS. 12A-12D. Suitable SLMs can be obtained from the manufacturers described above. As shown in FIG. 9C, in this embodiment, the mirror 960 is replaced by a beam splitter 965 that combines the target pattern of static dipole traps 985 in the n-position array from the second SLM 980 with the additional target pattern of static dipole traps 958 from the third SLM 955. A second laser beam 951 illuminates the third SLM 955. To avoid interference between the static dipole traps 985 and 958, the frequency of the laser beam 951 can be different from the frequency of the laser beam 910 or the frequency can be shifted by a phase modulator 952. Suitable phase modulators can be obtained from AdvR (e.g., KTP phase modulator, Bozeman MT), or Jenoptik (e.g., PMXXX Series (PM635, PM705, PM830, PM1064, PM1550), Jena Germany). As shown in FIG. 12A, the new static dipole traps 1210 have a deeper trap depth than the static dipole traps 1220 in the n-position array shown in in FIGS. 12B-12D (n=26×8), and the atom 1230 is adiabatically transported into the deeper trap 1210. This approach to creating a new target pattern array 1210 requires the at least partial overlap between static dipole traps 1210 and 1220 shown in FIG. 12A, but is faster than creating a new higher resolution array of static dipole traps by the process shown in FIGS. 8A-8D and described above.

Figure 9D:
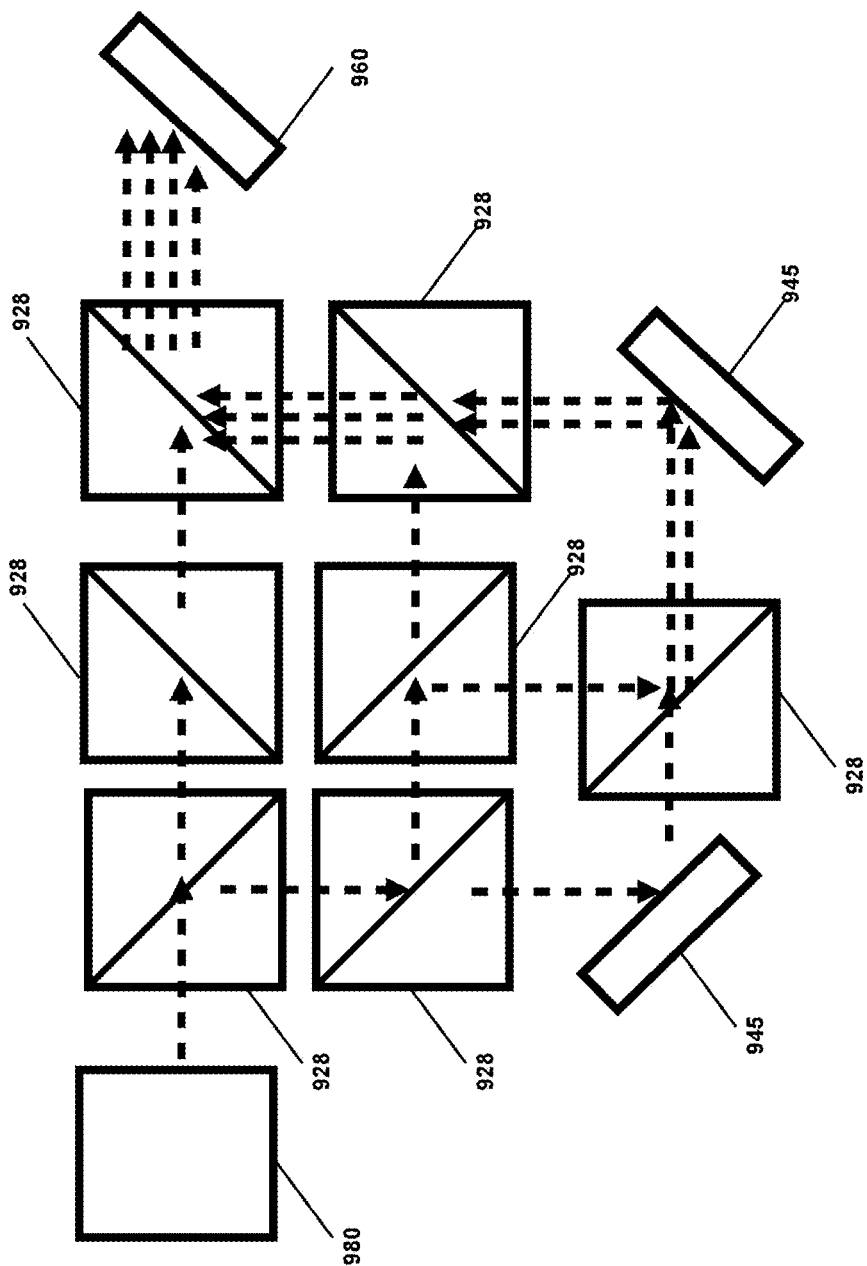
FIG. 9D schematically illustrates a series of beam splitters for a system for arranging atoms in arrays in accordance with one or more embodiments.

As shown in FIG. 9D, the system 900 can include at least one 50:50 beam splitter 928, seven beam splitters 928 shown in FIG. 9D, after the second SLM 980. In combination with mirrors 945, the series of beam splitters 928 produces copies of the n-position static dipole trap array, four copies of the beams shown in FIG. 9D, and four copies (ensembles 1-4) of the target trap array 1310 shown in FIG. 13. The ensembles should be as identical as possible. This arrangement of atoms enables, for example, encoding a unit-disk-graph implementation of the maximum independent set (MIS) combinatorial optimization problem, and running experiments to find solutions either serially or simultaneously as described further below.

Figure 9E:
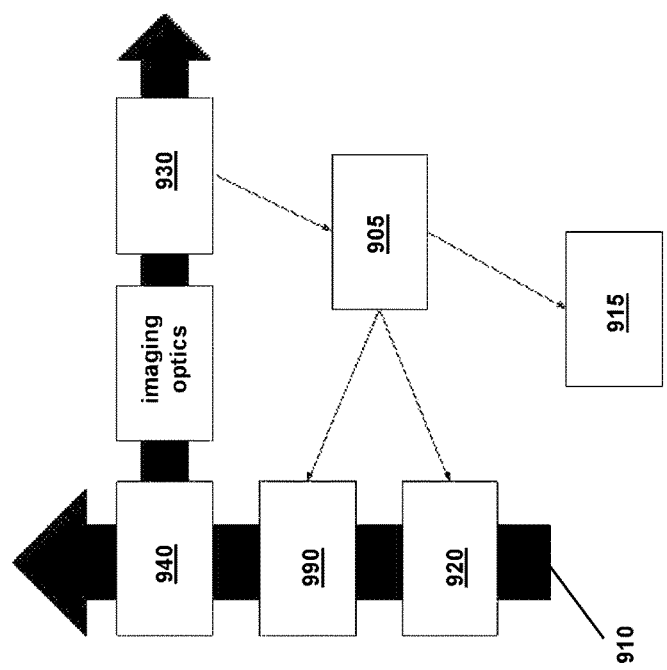
FIG. 9E schematically illustrates a control system and data flow for a system for arranging atoms in arrays in accordance with one or more embodiments.

As shown in the block diagram of the control system and data flow illustrated in FIG. 9E, the first SLM 920 and the scanner 990 are synchronized by a controller 905. The controller 905 reads the fluorescence image of atoms 940 from camera 930 and produces a set of binary images for the first SLM 920 that are transferred to the first SLM 920 control board. The controller 905 also produces the scanning angle steps that are transferred to the scanner 990 control board. The controller 905 also controls the Pockels cell 915 in a synchronized way with other devices to distribute the intensity of the laser light 910 between the switchable 925 and static 985 dipole trap arrays shown in FIG. 9B, respectively. In this way, the controller 905 can be configured to receive the sensor data generated by the sensor 930, and operate the optical system 920 and the scanner 990 to perform a plurality of operations without receiving further sensor data from the sensor 930, wherein in each of the plurality of operations a plurality of atoms is moved within the 3-dimensional space.

The above techniques enable the generation of very large arrays of cold atoms: SLMs such as digital micromirror devices (DMDs) can generate on the order of 1000×1000 traps for about one million (1M) atoms. This immense nunmber of qubits can be used to run very large quantum programs, although this will require a long circuit depth and therefore higher gate fidelities and perhaps error correction. In the near-term, however, this large array is already very useful for running a large number of experiments simultaneously. In particular, consider an arrangement of atoms to encode a unit-disk-graph implementation of the maximum independent set (MIS) combinatorial optimization problem, as described in PCT Application No. PCT/US2019/49115, entitled QUANTUM OPTIMIZATION FOR MAXIMUM INDEPENDENT SET USING RYDBERG ATOM ARRAYS, filed on Aug. 30, 2019, which is hereby incorporated by reference in its entirety. Consider as an example a target pattern that encodes this MIS problem that contains about 100 atom sites.

Figure 13:
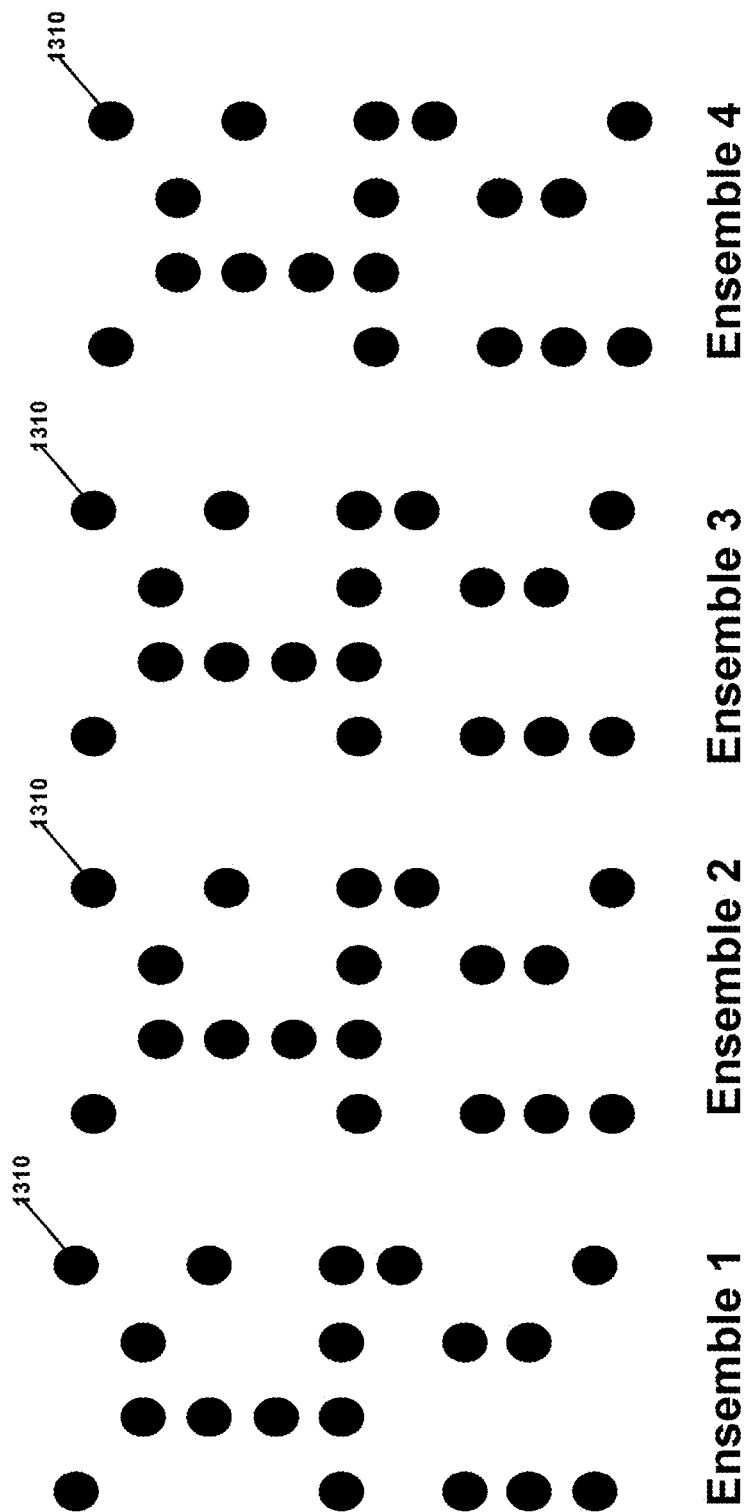
FIG. 13 schematically illustrates four graph ensembles of combinatorial optimization problems in accordance with one or more embodiments.
Figure 14:
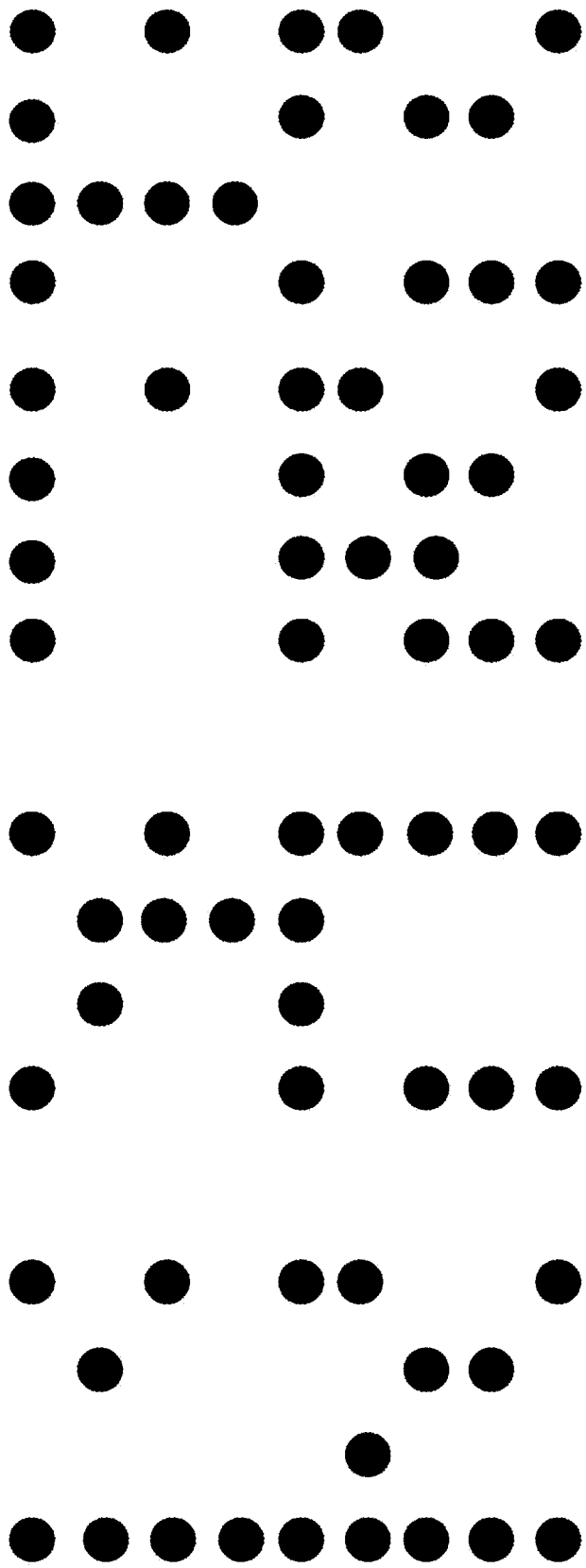
FIG. 14 schematically illustrates four results of experiments/computations of graph ensembles of combinatorial optimization problems in accordance with one or more embodiments.

If laser power is limited, then a large number of experiments can be run in short succession, as follows:
  a. Starting from about 0.5M atoms that are randomly loaded into about 1M trap sites, load these atoms into about 1,000 blocks of 100 atoms in each array. Discard remaining atoms.
  b. Apply a laser pulse sequence of quantum circuits (e. g., quantum approximate optimization algorithm (QAOA) circuits) to block #1. This takes about 1-10 µs. Use anti-trapping of Rydberg-state atoms to encode the results of this experiment into the ground state of the atoms that remain in this experiment. This gate sequence can, for the unit-disk-graph MIS graph problem, be realized using just a single laser beam that is directed to ensemble #1 shown in FIG. 12 using a fast beam deflector, such as an acousto-optic—deflector or an electro-optic deflector.

c. Using the deflector to direct the beam for the Rydberg gates to other blocks, repeat step (b) over the remaining 999 ensembles. Results obtained from four ensembles are shown in FIG. 13.

d. Use fluorescent readout to measure the states of all qubits over all qubits from all experiments, simultaneously.

e. At this point, 1000 experiments with identical QAOA conditions will have been completed in a time of the order of 1-10 ms. This is about 1000 times faster than without this proposed parallelized process. Based on the measurements in (d), update QAOA sequence and repeat the process from step (a). Note that since the experiments were performed sequentially, Rydberg atoms between nearby blocks never experienced crosstalk.

If no limitation on laser power exists, then all experiments can be performed simultaneously. If there is some cross-talk between Rydberg states in neighboring ensembles, then experiments can be performed in superblocks of, for example, 10-100 ensembles each.

In other embodiments, fluorescence readout can be interspersed along the way of the experiments in order to update the QAOA sequence between ensembles. The measurements can be performed by measuring only a region of interest from the camera or by faster detectors, such as arrays of avalanche photodiodes.

Even without measurement, the QAOA sequence may be changed along the way—for example, to measure gradients in the QAOA MIS performance.

In some embodiments, rather than the simple QAOA MIS experiment on the unit disk graph, many other types of algorithms could be implemented, such as individual-qubit gate sequences, or the like.

If the power for Rydberg gates were not limited, then the Rydberg gate pulses could be spatially copied to many blocks and thus implemented simultaneously. For practical purposes, there will likely be a happy medium between simultaneously performed and temporally separated experiments in between the approximately 1M qubit array preparation steps and the approximately 1M qubit readout steps.

In accordance with one or more embodiments, as shown in FIGS. 10A and 10B, a system 1000 for arranging atoms within a 3-dimensional space includes a first optical system operable to produce an optical lattice that forms a regularly spaced n-position array of optical traps within the 3-dimensional space, the first optical system formed from a mirror 1065, a phase modulator 1070, and a retroreflector 1075, that creates an optical lattice 1047 that generates an n-position array of dipole traps 1047 that trap atoms 1040 inside atomic vapor cell 1045, a second optical system operable to produce an array of switchable optical traps within the regularly spaced n-position array, the second optical system including a first spatial light modulator (SLM) 1020 that splits the laser beam 1010 into multiple laser beams 1025 that are imaged onto a second SLM 1080 that traps atoms 1041 within switchable optical traps in the n-position array 1047, a sensor 1030 configured to detect atoms captured within the regularly spaced n-position array of optical traps, such as an optical camera 1030 that images positions y(l) of atoms l within the n-position array 1047, the phase modulator 1070 configured to shift the frequency of the laser light as well as to adjust a phase $\Delta$ of the optical lattice 1047 such that atoms 11040 move by a number of positions $d_l = y(l) - 1$ within the n-position array 1047, wherein $d_l$ is expressed as an m-bit binary number, with $m = \text{round}(\log_2(n-1))$, and the phase modulator 1070 is configured to move atoms 11040 stepwise by a number of positions $d_{l,k} = a_{l,k} 2^k$, wherein $a_{l,k} \in \{0,1\}$ is the bit k in the binary expression of $d_l$ for each atom l, and $k = 0, 1, \ldots, m$. As shown in FIG. 10B, atoms 1041 are trapped in beams 1025 and do not move as atoms 1040 are moved as the phase modulator 1070 adjusts the phase $\Delta$ of the optical lattice 1047 by a minimum of half the wavelength of the optical lattice 1047. The controller 1005 also controls the Pockels cell 1015 in a synchronized way with other devices to distribute the laser light 1010 between the optical lattice 1047 and switchable 1025 dipole trap arrays, respectively. In this way, the controller 1005 is configured to operate the optical system and the phase modulator to sort atoms within the regularly spaced n-position array into a desired configuration of atoms, said operation of the optical system and the phase modulator being based at least in part on sensor data generated by the sensor detecting atoms captured within the regularly spaced n-position array of optical traps. In some embodiments, the first 1020 and second 1080 SLMs each can be intensity SLMs. In other embodiments, the first 1020 and second 1080 SLMs each can be phase SLMs. In certain embodiments, the first 1020 and second 1080 SLMs each can be digital mirror devices (DMDs), ferroelectric liquid-crystal (FLC) SLMs, liquid-crystal-on-silicon (LCOS) SLMs, multiple quantum well arrays, deformable micromirror arrays, arrays of surface acoustic wave (SAW) transducers, arrays of acousto-optic deflectors (AODs), magneto-optic SLMs. or tunable microcavity arrays. Suitable SLMs can be obtained from the manufacturers described above. In some embodiments, the phase modulator 1070 can be three electro-optic modulators (EOMs) that tune the phase $\Delta$ of the 3-dimensional optical lattice 1047. Suitable phase modulators can be obtained from the manufacturers described above. In certain embodiments, the array can be a two-dimensional (2D) array. In some embodiments, the optical lattice 1047 can be a two-dimensional (2D) optical lattice 1047. In some of these embodiments, the phase modulator 1070 can be a pair of electro-optic modulators (EOMs) that tune the phase $\Delta$ of the two-dimensional optical lattice 1047.

Further Example Embodiments

Example 1 is a system for arranging atoms within a 3-dimensional space that includes an optical system operable to produce a plurality of switchable optical traps within the 3-dimensional space, a sensor configured to detect atoms within the plurality of switchable optical traps, a scanner operable to simultaneously move multiple atoms within the plurality of switchable optical traps, and at least one controller configured to operate the optical system and the scanner to sort atoms within the plurality of switchable optical traps into a desired configuration of atoms, said operation of the optical system and the scanner being based at least in part on sensor data generated by the sensor detecting atoms within the plurality of switchable optical traps.

Example 2 includes the subject matter of Example 1, wherein the optical system can comprise at least one spatial light modulator (SLM) that, when operated, deactivates one or more switchable optical traps of the plurality of switchable optical traps.

Example 3 includes the subject matter of Example 2, wherein the at least one controller can be further configured to operate the at least one SLM to activate or deactivate the one or more switchable optical traps.

Example 4 includes the subject matter of any of Examples 1-3, wherein the optical system can further include a second spatial light modulator (SLM) operable to produce a plurality of static optical traps within the 3-dimensional space that have shallower trap potentials than the array of switchable optical traps produced by the optical system.

Example 5 includes the subject matter of Example 4, wherein the array of static optical traps can form a regularly spaced array in a 2-dimensional plane within the 3-dimensional space.

Example 6 includes the subject matter of any of Examples 1-5, wherein the sensor can comprise an optical camera.

Example 7 includes the subject matter of any of Examples 5-6, wherein the desired configuration of atoms can be a close-packed configuration.

Example 8 includes the subject matter of any of Examples 1-7, wherein the scanner can include a mirror galvanometer and a focus tunable lens.

Example 9 includes the subject matter of any of Examples 1-8, wherein the at least one controller can be configured to receive the sensor data generated by the sensor, and operate the optical system and the scanner to perform a plurality of operations without receiving further sensor data from the sensor, wherein in each of the plurality of operations a plurality of atoms is moved within the 3-dimensional space.

Example 10 includes the subject matter of any of Examples 1-9, wherein the plurality of switchable optical traps can be arranged in a regularly spaced n-position array.

Example 11 includes the subject matter of Example 10, wherein the at least one controller can be configured to determine, based on the sensor data generated by the sensor, a number of positions to move each of a plurality of atoms captured within the array of switchable optical traps to sort the atoms into the desired configuration within the regularly spaced n-position array, and generate, based on the determined number of positions for each of the plurality of atoms, a sequence of operations in which the plurality of atoms is moved using the scanner from initial positions in the 3-dimensional space to close-packed positions in the 3-dimensional space.

Example 12 includes the subject matter of any of Examples 10-11, wherein during at least one operation of the sequence of operations, at least two of the plurality of atoms are simultaneously moved using the scanner.

Example 13 includes the subject matter of any of Examples 10-12, wherein the number of positions for each of the plurality of atoms can be expressed as a binary number, and the at least one controller can be configured to generate the sequence of operations by, for each atom of the plurality of atoms, interpreting each bit of the binary number from least significant bit to most significant bit as instructions to move, or not move, the atom based on whether the bit is a one or a zero, respectively.

Example 14 includes the subject matter of any of Examples 10-13, wherein the at least one controller can be configured to determine the number of positions d(l) to move each atom l of the plurality of atoms using the scanner to sort the atoms into the desired configuration, express the determined number of positions for each of the plurality of atoms d(l) as an m-bit binary number, where $m=\text{round}(\log_2(n-1))$, operate the scanner to move each atom l by a number of positions $d_{l,k}=a_{l,k} 2^k$, wherein $a_{l,k}\in\{0,1\}$ is the bit k in the binary number for each atom l, and repeat m times the moving of each atom l, incrementing $k=k+1$ each time from $k=0$.

Example 15 includes the subject matter of Example 10, wherein the at least one controller can be configured to determine, based on the sensor data generated by the sensor, a number of positions to move each of a plurality of atoms captured within the array of switchable optical traps to sort the atoms into the desired configuration within the regularly spaced n-position array, and generate, based on the determined number of positions for each of the plurality of atoms, a sequence of operations in which the plurality of atoms is moved using the scanner from close-packed positions in the 3-dimensional space to target positions in the 3-dimensional space.

Example 16 includes the subject matter of Example 15, wherein during at least one operation of the sequence of operations, at least two of the plurality of atoms are simultaneously moved using the scanner.

Example 17 includes the subject matter of any of Examples 15-16, wherein the number of positions for each of the plurality of atoms can be expressed as a binary number, and the at least one controller can be configured to generate the sequence of operations by, for each atom of the plurality of atoms, interpreting each bit of the binary number from most significant bit to least significant bit as instructions to move, or not move, the atom based on whether the bit is a one or a zero, respectively.

Example 18 includes the subject matter of Example 17, wherein the at least one controller can be configured to determine the number of positions f(l) to move each atom l of the plurality of atoms using the scanner to sort the atoms into the desired configuration within the regularly spaced n-position array, express the determined number of positions for each of the plurality of atoms f(l) as an m-bit binary number, where $m=\text{round}(\log_2(n-1))$, operate the scanner to move each atom l by a number of positions $f_{l,k}=a_{l,k} 2^k$, wherein $a_{l,k}\in\{0,1\}$ is the bit k in the binary number for each atom l, and repeat the moving of each atom l, decrementing $k=k-1$ each time until $k=0$.

Example 19 includes the subject matter of Example 10, wherein the at least one controller can be configured to determine, based on the sensor data generated by the sensor, a number of positions to move each of a plurality of atoms captured within the array of switchable optical traps to sort the atoms into the desired configuration within the regularly spaced n-position array, and generate, based on the determined number of positions for each of the plurality of atoms, a sequence of operations in which the plurality of atoms is moved using the scanner from initial positions in the 3-dimensional space to target positions in a regularly spaced h-position array of switchable high-resolution optical traps having a higher resolution than the n-position array within the 3-dimensional space.

Example 20 includes the subject matter of Example 19, wherein during at least one operation of the sequence of operations, at least two of the plurality of atoms can be simultaneously moved using the scanner.

Example 21 includes the subject matter of any of Examples 19-20, wherein the number of positions for each of the plurality of atoms can be expressed as a binary number, and the at least one controller can be configured to generate the sequence of operations by, for each atom of the plurality of atoms, interpreting each bit of the binary number from least significant bit to most significant bit as instructions to move, or not move, the atom based on whether the bit is a one or a zero, respectively.

Example 22 includes the subject matter of any of Examples 19-21, wherein the at least one controller can be configured to determine the number of positions g(l) to move each atom l of the plurality of atoms using the scanner to sort the atoms into the desired configuration within the regularly spaced h-position array, express the determined number of positions for each of the plurality of atoms g(l) as a u-bit binary number, where u=round($\log_2$(h−1)), operate the scanner to move each atom l by a number of positions $g_{l,k}=a_{l,k}\ 2^k$, wherein $a_{l,k}\in\{0,1\}$ is the bit k in the binary number for each atom l, and repeat u times the moving of each atom l, incrementing k=k+1 each time from k=0.

Example 23 is a method for arranging atoms within a 3-dimensional space includes operating an optical system to produce a plurality of switchable optical traps within the 3-dimensional space, detecting atoms captured within the plurality of switchable optical traps using a sensor, operating a scanner to simultaneously move multiple atoms within the array of switchable optical traps, and operating, using at least one controller, the optical system and the scanner to sort atoms within the plurality of switchable optical traps into a desired configuration of atoms, said operation of the optical system and the scanner being based at least in part on sensor data generated by the sensor detecting atoms within the plurality of switchable optical traps.

Example 24 includes the subject matter of Example 23, further including operating at least one spatial light modulator (SLM) to deactivate one or more switchable optical traps of the plurality of switchable optical traps.

Example 25 includes the subject matter of any of Examples 23-24, further including operating a second spatial light modulator (SLM) to produce a regularly spaced n-position array of static optical traps within the 3-dimensional space that have shallower trap potentials than the array of switchable optical traps produced by the optical system.

Example 26 includes the subject matter of Example 25, wherein the array of static optical traps can form a regularly spaced array in a 2-dimensional plane within the 3-dimensional space.

Example 27 includes the subject matter of any of Examples 23-26, wherein the sensor can comprise an optical camera.

Example 28 includes the subject matter of any of Examples 23-27, wherein the desired configuration can be a close-packed configuration.

Example 29 includes the subject matter of any of Examples 23-28, wherein the scanner can include a mirror galvanometer and a focus tunable lens.

Example 30 includes the subject matter of any of Examples 23-29, further including receiving, by the at least one controller, the sensor data generated by the sensor, and operating, by the at least one controller, the optical system and the scanner to perform a plurality of operations without receiving further sensor data from the sensor, wherein in each of the plurality of operations a plurality of atoms is moved within the 3-dimensional space.

Example 31 includes the subject matter of any of Examples 23-30, wherein the plurality of switchable optical traps can be arranged in a regularly spaced n-position array.

Example 32 includes the subject matter of Example 31, further including determining by the at least one controller based on the sensor data generated by the sensor, a number of positions to move each of a plurality of atoms captured within the array of switchable optical traps to sort the atoms into the desired configuration within the regularly spaced n-position array, and generating, by the at least one controller based on the determined number of positions for each of the plurality of atoms, a sequence of operations in which the plurality of atoms is moved using the scanner from initial positions in the 3-dimensional space to close-packed positions in the 3-dimensional space.

Example 33 includes the subject matter of Example 32, wherein during at least one operation of the sequence of operations, at least two of the plurality of atoms can be simultaneously moved using the scanner.

Example 34 includes the subject matter of Example 33, wherein the number of positions for each of the plurality of atoms can be expressed as a binary number, and the method can further comprise generating, by the at least one controller, the sequence of operations by, for each atom of the plurality of atoms, interpreting each bit of the binary number from least significant bit to most significant bit as instructions to move, or not move, the atom based on whether the bit is a one or a zero, respectively.

Example 35 includes the subject matter of any of Examples 32-34, further including by the at least one controller, determining the number of positions d(l) to move each atom l of the plurality of atoms using the scanner to sort the atoms into the desired configuration, expressing the determined number of positions for each of the plurality of atoms d(l) as an m-bit binary number, where m=round($\log_2$(n−1)), operating the scanner to move each atom l by a number of positions $d_{l,k}=a_{l,k}\ 2^k$, wherein $a_{l,k}\in\{0,1\}$ is the bit k in the binary number for each atom l, and repeating m times the moving of each atom l, incrementing k=k+1 each time from k=0.

Example 36 includes the subject matter of Example 31, further including by the at least one controller, determining, based on the sensor data generated by the sensor, a number of positions to move each of a plurality of atoms captured within the array of switchable optical traps to sort the atoms into the desired configuration within the regularly spaced n-position array, and generating, based on the determined number of positions for each of the plurality of atoms, a sequence of operations in which the plurality of atoms is moved using the scanner from close-packed positions in the 3-dimensional space to target positions in the 3-dimensional space.

Example 37 includes the subject matter of Example 36, wherein during at least one operation of the sequence of operations, at least two of the plurality of atoms can be simultaneously moved using the scanner.

Example 38 includes the subject matter of any of Examples 36-37, wherein the number of positions for each of the plurality of atoms can be expressed as a binary number, and the at least one controller can be configured to generate the sequence of operations by, for each atom of the plurality of atoms, interpreting each bit of the binary number from most significant bit to least significant bit as instructions to move, or not move, the atom based on whether the bit is a one or a zero, respectively.

Example 39 includes the subject matter of any of Examples 36-38, further including, by the at least one controller, determining the number of positions f(l) to move each atom l of the plurality of atoms using the scanner to sort the atoms into the desired configuration within the regularly spaced n-position array, expressing the determined number of positions for each of the plurality of atoms f(l) as an m-bit binary number, where m=round($\log_2$(n−1)), operating the scanner to move each atom l by a number of positions $f_{l,k}=a_{l,k}\ 2^k$, wherein $a_{l,k}\in\{0,1\}$ is the bit k in the binary number for each atom l, and repeating the moving of each atom l, decrementing k=k−1 each time until k=0.

Example 40 includes the subject matter of Example 31, further including, by the at least one controller, determining, based on the sensor data generated by the sensor, a number of positions to move each of a plurality of atoms captured within the array of switchable optical traps to sort the atoms into the desired configuration within the regularly spaced n-position array, and generating, based on the determined number of positions for each of the plurality of atoms, a sequence of operations in which the plurality of atoms is moved using the scanner from initial positions in the 3-dimensional space to target positions in a regularly spaced h-position array of switchable high-resolution optical traps having a higher resolution than the n-position array within the 3-dimensional space.

Example 41 includes the subject matter of Example 40, wherein during at least one operation of the sequence of operations, at least two of the plurality of atoms can be simultaneously moved using the scanner.

Example 42 includes the subject matter of any of Examples 40-41, wherein the number of positions for each of the plurality of atoms can be expressed as a binary number, and the at least one controller can be configured to generate the sequence of operations by, for each atom of the plurality of atoms, interpreting each bit of the binary number from least significant bit to most significant bit as instructions to move, or not move, the atom based on whether the bit is a one or a zero, respectively.

Example 43 includes the subject matter of any of Examples 40-42, further including, by the at least one controller, determining the number of positions g(l) to move each atom l of the plurality of atoms using the scanner to sort the atoms into the desired configuration within the regularly spaced h-position array, expressing the determined number of positions for each of the plurality of atoms g(l) as a u-bit binary number, where $u=\mathrm{round}(\log_2(h-1))$, operating the scanner to move each atom l by a number of positions $g_{l,k}=a_{l,k} 2^k$, wherein $a_{l,k} \in \{0,1\}$ is the bit k in the binary number for each atom l, and repeating u times the moving of each atom l, incrementing k=k+1 each time from k=0.

Example 44 is at least one non-transitory computer readable medium that comprises instructions that, when executed, perform a method for arranging atoms within a plurality of optical traps arranged within a 3-dimensional space, the method comprising operating an optical system to produce a plurality of switchable optical traps within the 3-dimensional space, detecting atoms captured within the plurality of switchable optical traps using a sensor, operating a scanner to simultaneously move multiple atoms within the array of switchable optical traps, and operating, using at least one controller, the optical system and the scanner to sort atoms within the plurality of switchable optical traps into a desired configuration of atoms, said operation of the optical system and the scanner being based at least in part on sensor data generated by the sensor detecting atoms within the plurality of switchable optical traps Example 45 is a system for arranging atoms within a 3-dimensional space includes a first optical system operable to produce an optical lattice that forms a regularly spaced n-position array of optical traps within the 3-dimensional space, a second optical system operable to produce an array of switchable optical traps within the regularly spaced n-position array, a sensor configured to detect atoms captured within the regularly spaced n-position array of optical traps, a phase modulator operable to adjust a phase of the optical lattice to simultaneously move multiple atoms captured within the regularly spaced n-position array of optical traps, and at least one controller configured to operate the optical system and the phase modulator to sort atoms within the regularly spaced n-position array into a desired configuration of atoms, said operation of the optical system and the phase modulator being based at least in part on sensor data generated by the sensor detecting atoms captured within the regularly spaced n-position array of optical traps.

Example 46 is a method for arranging atoms within a plurality of optical traps arranged within a 3-dimensional space includes generating, using at least one processor, a sequence of operations in which a plurality of atoms are moved amongst the plurality of optical traps from initial positions in the 3-dimensional space to target positions in the 3-dimensional space, wherein during at least one operation of the sequence of operations, at least two of the plurality of atoms are simultaneously moved amongst traps of the plurality of optical traps, and operating a scanner to move one or more of the plurality of atoms amongst traps of the plurality of optical traps in accordance with the generated sequence of operations.

Example 47 includes the subject matter of Example 46, further including generating, using a sensor, sensor data representing positions of the plurality of atoms within the plurality of optical traps, and operating the scanner to perform the sequence of operations without generating further sensor data representing positions of the plurality of atoms within the plurality of optical traps.

Example 48 includes the subject matter of Example 47, wherein the sensor data can indicate which of the plurality of optical traps contain one of the plurality of atoms.

Example 49 includes the subject matter of any of Examples 46-48, wherein the plurality of optical traps can produce a regularly spaced array in the 3-dimensional space.

Example 50 includes the subject matter of any of Examples 46-49, wherein the plurality of optical traps can produce the regularly spaced array in a 2-dimensional plane within the 3-dimensional space.

Example 51 includes the subject matter of any of Examples 46-50, further including generating the plurality of optical traps by operating at least one spatial light modulator (SLM).

Example 52 includes the subject matter of any of Examples 46-51, wherein the scanner can be configured to produce a plurality of movable traps within the 3-dimensional space that have lower potentials than the plurality of optical traps.

Example 53 includes the subject matter of any of Examples 46-52, further including determining, by the at least one processor based on the sensor data generated by the sensor, a number of positions to move each of a plurality of atoms amongst traps of the plurality of optical traps to sort the atoms into a desired configuration.

Example 54 includes the subject matter of any of Examples 46-53, further including expressing, using the at least one processor, the determined number of positions for each of the plurality of atoms as a binary number, and generating, using the at least one processor, the sequence of operations by, for each atom of the plurality of atoms, interpreting each bit of the binary number from least significant bit to most significant bit as instructions to move, or not move, the atom based on whether the bit is a one or a zero, respectively.

Example 55 includes the subject matter of Example 54, wherein the plurality of optical traps can produce a regularly spaced n-position array in the 3-dimensional space, and the method further includes, using the at least one processor determining the number of positions d(l) to move each atom l of the plurality of atoms amongst traps of the plurality of optical traps to sort the atoms into the desired configuration, expressing the determined number of positions for each of the plurality of atoms d(l) as an m-bit binary number, where m=round(log$_2$(n−1)), operating the scanner to move each atom l by a number of positions $d_{l,k}=a_{l,k}2^k$, wherein $a_{l,k}\in\{0, 1\}$ is the bit k in the binary number for each atom l, and repeating m times the moving of each atom l, incrementing k=k+1 each time from k=0.

Example 56 includes the subject matter of Example 55, wherein the desired configuration can be a close packed configuration.

Example 57 is at least one non-transitory computer readable medium comprises instructions that, when executed, perform a method for arranging atoms within a plurality of optical traps arranged within a 3-dimensional space, the method comprising generating, using at least one processor, a sequence of operations in which a plurality of atoms are moved amongst the plurality of optical traps from initial positions in the 3-dimensional space to target positions in the 3-dimensional space, wherein during at least one operation of the sequence of operations, at least two of the plurality of atoms are simultaneously moved amongst traps of the plurality of optical traps, and operating a scanner to move one or more of the plurality of atoms amongst traps of the plurality of optical traps in accordance with the generated sequence of operations.

EQUIVALENTS

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A system for arranging atoms within a 3-dimensional space, the system comprising:
   an optical system operable to produce a plurality of switchable optical traps within the 3-dimensional space;
   a sensor configured to detect atoms within the plurality of switchable optical traps;
   a scanner operable to simultaneously move multiple atoms within the plurality of switchable optical traps; and
   at least one controller configured to operate the optical system and the scanner to sort atoms within the plurality of switchable optical traps into a desired configuration of atoms by:
      determining, based on sensor data generated by the sensor, a number of positions to move atoms of a plurality of atoms captured in the 3-dimensional space, wherein the determined number of positions are expressed as binary numbers;
      generating a sequence of operations by which the atoms could be moved into the desired configuration, wherein the sequence of operations is generated based at least in part on bits of the binary numbers, wherein the bits of the binary numbers are associated with an instruction to move, or not move, an associated atom based on whether a bit is a one or a zero, respectively; and
      moving, using the scanner, at least one atom of the plurality of atoms according to the generated sequence of operations.

2. The system of claim 1, wherein the optical system comprises at least one spatial light modulator (SLM) that, when operated, deactivates one or more switchable optical traps of the plurality of switchable optical traps.

3. The system of claim 2, wherein the at least one controller is further configured to operate the at least one SLM to activate or deactivate the one or more switchable optical traps.

4. The system of claim 2, wherein the optical system further includes a second spatial light modulator (SLM) operable to produce a plurality of static optical traps within the 3-dimensional space that have shallower trap potentials than the plurality of switchable optical traps produced by the optical system.

5. The system of claim 4, wherein the plurality of static optical traps forms a regularly spaced array in a 2-dimensional plane within the 3-dimensional space.

6. The system of claim 1, wherein the sensor comprises an optical camera.

7. The system of claim 1, wherein the desired configuration of atoms is a close-packed configuration.

8. The system of claim 1, wherein the scanner includes a mirror galvanometer and a focus tunable lens.

9. The system of claim 1, wherein the at least one controller is configured to:
   receive the sensor data generated by the sensor; and
   operate the optical system and the scanner to perform a plurality of operations without receiving further sensor data from the sensor, wherein in operations of the plurality of operations a plurality of atoms is moved within the 3-dimensional space.

10. The system of claim 1, wherein the plurality of switchable optical traps is arranged in a regularly spaced n-position array.

11. The system of claim 10, wherein
generating the sequence of operations comprises generating a sequence of operations by which the plurality of atoms could be moved using the scanner from initial positions in the 3-dimensional space to close-packed positions in the 3-dimensional space.

12. The system of claim 11, wherein during at least one operation of the sequence of operations, at least two of the plurality of atoms are simultaneously moved using the scanner.

13. The system of claim 12, wherein
generating the sequence of operations comprises generating a sequence of operations by, for an atom of the plurality of atoms, interpreting bits of the binary numbers from least significant bit to most significant bit as instructions to move, or not move, an atom of the plurality of atoms based on whether a bit is a one or a zero, respectively.

14. The system of claim 13, wherein the at least one controller is configured to:
determine the number of positions d(l) to move an atom l of the plurality of atoms to sort the atoms into the desired configuration;
express the determined number of positions for the atom l of the plurality of atoms d(l) as one of the binary numbers comprising an m-bit binary number, where $m=\text{round}(\log_2(n-1))$;
operate the scanner to move the atom l by a number of positions $d_{l,k}=a_{l,k}2^k$, wherein $a_{l,k}\in\{0,1\}$ is a bit k in the binary number associated with the atom l; and
repeat m times the moving of the atom l, incrementing k=k+1 each time from k=0.

15. The system of claim 10, wherein
generating the sequence of operations comprises generating a sequence of operations in which atoms of the plurality of atoms could be moved using the scanner from close-packed positions in the 3-dimensional space to target positions in the 3-dimensional space.

16. The system of claim 15, wherein during at least one operation of the sequence of operations, at least two of the plurality of atoms are simultaneously moved using the scanner.

17. The system of claim 16, wherein
generating the sequence of operations comprises generating a sequence of operations by, for atoms of the plurality of atoms, interpreting bits of the binary number from most significant bit to least significant bit as instructions to move, or not move, the atom based on whether a bit is a one or a zero, respectively.

18. The system of claim 17, wherein the at least one controller is configured to:
determine the number of positions f(l) to move an atom l of the plurality of atoms to sort the atoms into the desired configuration within the regularly spaced n-position array;
express the determined number of positions for an atom l of the plurality of atoms f(l) as an m-bit binary number, where $m=\text{round}(\log_2(n-1))$;
operate the scanner to move the atom l by a number of positions $f_{l,k}=a_{l,k}2^k$ wherein $a_{l,k}\in\{0,1\}$ is a bit k in the binary number for the atom l; and
repeat the moving of the atom l, decrementing k=k-1 each time until k=0.

19. The system of claim 10, wherein
generating the sequence of operations comprises generating, based on the determined number of positions for atoms of the plurality of atoms, a sequence of operations in which the atoms of the plurality of atoms is moved using the scanner from initial positions in the 3-dimensional space to target positions in a regularly spaced h-position array of switchable high-resolution optical traps having a higher resolution than the regularly spaced n-position array within the 3-dimensional space.

20. The system of claim 19, wherein during at least one operation of the sequence of operations, at least two of the plurality of atoms are simultaneously moved using the scanner.

21. The system of claim 20, wherein the number of positions for atoms of the plurality of atoms is expressed as a binary number, and wherein the at least one controller is configured to:
generate the sequence of operations by, for the atoms of the plurality of atoms, interpreting bits of the binary number from least significant bit to most significant bit as instructions to move, or not move, the atom based on whether a bit is a one or a zero, respectively.

22. The system of claim 21, wherein the at least one controller is configured to:
determine the number of positions g(l) to move an atom l of the plurality of atoms using the scanner to sort the atoms into the desired configuration within the regularly spaced h-position array;
express the determined number of positions for the atom l as a u-bit binary number, where $u=\text{round}(\log_2(h-1))$;
operate the scanner to move the atom l by a number of positions $g_{l,k}=a_{l,k}2^k$, wherein $a_{l,k}\in\{0,1\}$ is a bit k in the binary number for the atom l; and
repeat u times the moving of the atom l, incrementing k=k+1 each time from k=0.

23. A method for arranging atoms within a 3-dimensional space, the method comprising:
operating an optical system to produce a plurality of switchable optical traps within the 3-dimensional space;
detecting initial positions of atoms captured within the plurality of switchable optical traps using a sensor;
expressing, as binary numbers, a number of positions to move the atoms of a plurality of atoms captured in the 3-dimensional space from the initial positions to final positions in a desired configuration within the 3-dimensional space;
operating the optical system and a scanner to move atoms within the plurality of switchable optical traps to the final positions in the 3-dimensional space, wherein operating the optical system and the scanner is performed according to a sequence of operations generated based at least in part on bits of the binary numbers, wherein the bits of the binary numbers are associated with an instruction to move, or not move, an associated atom based on whether a bit is a one or a zero, respectively.

24. The method of claim 23, further comprising operating at least one spatial light modulator (SLM) to deactivate one or more switchable optical traps of the plurality of switchable pal optical traps.

25. The method of claim 24, further comprising operating a second spatial light modulator (SLM) to produce a regularly spaced n-position array of static optical traps within the 3-dimensional space that have shallower trap potentials than the plurality of switchable optical traps produced by the optical system.

26. The method of claim 25, wherein the regularly spaced n-position array of static optical traps forms a regularly spaced array in a 2-dimensional plane within the 3-dimensional space.

27. The method of claim 23, wherein the sensor comprises an optical camera.

28. The method of claim 23, wherein the desired configuration is a close-packed configuration.

29. The method of claim 23, wherein the scanner includes a mirror galvanometer and a focus tunable lens.

30. The method of claim 23, further comprising:
receiving, by at least one controller, sensor data generated by the sensor; and
operating, by the at least one controller, the optical system and the scanner to perform a plurality of operations without receiving further sensor data from the sensor, wherein in operations of the plurality of operations a plurality of atoms is moved within the 3-dimensional space.

31. The method of claim 23, wherein the plurality of switchable optical traps is arranged in a regularly spaced n-position array.

32. The method of claim 31, further comprising:
determining, by at least one controller and based on sensor data generated by the sensor, a number of positions to move atoms of the plurality of atoms captured within the regularly spaced n-position array of switchable optical traps to sort the atoms into the desired configuration within the regularly spaced n-position array; and
generating, by the at least one controller and based on the determined number of positions for the atoms of the plurality of atoms, a sequence of operations in which the plurality of atoms is moved using the scanner from initial positions in the 3-dimensional space to close-packed positions in the 3-dimensional space.

33. The method of claim 32, wherein during at least one operation of the sequence of operations, at least two of the plurality of atoms are simultaneously moved using the scanner.

34. The method of claim 33, wherein the method further comprises:
generating, by the at least one controller, the sequence of operations by, for an atom of the plurality of atoms, interpreting bits of the binary number from least significant bit to most significant bit as instructions to move, or not move, the atom based on whether a bit is a one or a zero, respectively.

35. The method of claim 34, further comprising, by the at least one controller:
determining the number of positions d(l) to move an atom l of the plurality of atoms using the scanner to sort the atom into the desired configuration;
expressing the determined number of positions for the atom l of the plurality of atoms d(l) as an m-bit binary number, where $m=\text{round}(\log_2(n-1))$;
operating the scanner to move the atom l by a number of positions $d_{l,k}=a_{l,k}2^k$, wherein $a_{l,k}\in\{0,1\}$ is a bit k in the binary number for the atom l; and
repeating m times the moving of the atom l, incrementing k=k+1 each time from k=0.

36. The method of claim 31, further comprising:
determining, using at least one controller and based on sensor data generated by the sensor, a number of positions to move atoms of a plurality of atoms captured within the regularly spaced n-position array of switchable optical traps to sort the atoms into the desired configuration within the regularly spaced n-position array; and
generating, using the at least one controller and based on the determined number of positions for the atoms of the plurality of atoms, a sequence of operations in which the plurality of atoms is moved using the scanner from close-packed positions in the 3-dimensional space to target positions in the 3-dimensional space.

37. The method of claim 36, wherein during at least one operation of the sequence of operations, at least two of the plurality of atoms are simultaneously moved using the scanner.

38. The method of claim 37, wherein the at least one controller is configured to:
generate the sequence of operations by, for atoms of the plurality of atoms, interpreting bits of the binary number from most significant bit to least significant bit as instructions to move, or not move, the atom based on whether a bit is a one or a zero, respectively.

39. The method of claim 38, further comprising, by the at least one controller:
determining the number of positions f(l) to move an atom l of the plurality of atoms using the scanner to sort the atoms into the desired configuration within the regularly spaced n-position array;
expressing the determined number of positions for the atom l of the plurality of atoms f(l) as an m-bit binary number, where $m=\text{round}(\log_2(n-1))$;
operating the scanner to move the atom l by a number of positions $f_{l,k}=a_{l,k}2^k$, wherein $a_{l,k}\in\{0,1\}$ is a bit k in the binary number for the atom l; and
repeating the moving of the atom l, decrementing k=k−1 each time until k=0.

40. The method of claim 31, further comprising:
determining, using at least one controller and based on sensor data generated by the sensor, a number of positions to move atoms of a plurality of atoms captured within the regularly spaced n-position array of switchable optical traps to sort the atoms into the desired configuration within the regularly spaced n-position array; and
generating, using the at least one controller and based on the determined number of positions for the atoms of the plurality of atoms, a sequence of operations in which the plurality of atoms is moved using the scanner from initial positions in the 3-dimensional space to target positions in a regularly spaced h-position array of switchable high-resolution optical traps having a higher resolution than the n-position array within the 3-dimensional space.

41. The method of claim 40, wherein during at least one operation of the sequence of operations, at least two of the plurality of atoms are simultaneously moved using the scanner.

42. The method of claim 41, wherein the at least one controller is configured to:
generate the sequence of operations by, for atoms of the plurality of atoms, interpreting bits of the binary number from least significant bit to most significant bit as instructions to move, or not move, the atom based on whether a bit is a one or a zero, respectively.

43. The method of claim 42, further comprising, by the at least one controller:
determining the number of positions g(l) to move an atom l of the plurality of atoms using the scanner to sort the atoms into the desired configuration within the regularly spaced h-position array;
expressing the determined number of positions for the atom l of the plurality of atoms g(l) as a u-bit binary number, where $u=\text{round}(\log_2(h-1))$;
operating the scanner to move the atom l by a number of positions $g_{l,k}=a_{l,k}2^k$, wherein $a_{l,k}\in\{0,1\}$ is a bit k in the u-bit binary number for the atom l; and repeating u times the moving of the atom l, incrementing k=k+1 each time from k=0.

\* \* \* \* \*